(12) United States Patent
Farley et al.

(10) Patent No.: US 11,878,784 B2
(45) Date of Patent: Jan. 23, 2024

(54) AEROSPACE VEHICLE SYSTEM AND METHOD OF OPERATION

(71) Applicant: Space Perspective Inc., Kennedy Space Center, FL (US)

(72) Inventors: Rodger Farley, Kennedy Space Center, FL (US); Jane Poynter, Kennedy Space Center, FL (US); Taber MacCallum, Titusville, FL (US); Daniel James Window, London (GB); Nicholas Adrian Moyes, London (GB)

(73) Assignee: Space Perspective Inc., Kennedy Space Center, FL (US)

( * ) Notice: Subject to any disclaimer, the term of this patent is extended or adjusted under 35 U.S.C. 154(b) by 309 days.

(21) Appl. No.: 17/370,467

(22) Filed: Jul. 8, 2021

(65) Prior Publication Data
US 2021/0331778 A1     Oct. 28, 2021

Related U.S. Application Data

(63) Continuation of application No. 17/160,837, filed on Jan. 28, 2021, now Pat. No. 11,084,564.

(60) Provisional application No. 62/969,447, filed on Feb. 3, 2020.

(51) Int. Cl.
| | | |
|---|---|---|
| *B64B 1/44* | (2006.01) | |
| *B64B 1/40* | (2006.01) | |
| *B64D 1/12* | (2006.01) | |
| *B64D 17/18* | (2006.01) | |
| *B64D 11/00* | (2006.01) | |
| *B64B 1/64* | (2006.01) | |

(52) U.S. Cl.
CPC .............. *B64B 1/44* (2013.01); *B64B 1/40* (2013.01); *B64B 1/64* (2013.01); *B64D 1/12* (2013.01); *B64D 11/00* (2013.01); *B64D 17/18* (2013.01); *B64D 2011/0061* (2013.01)

(58) Field of Classification Search
CPC .... B64B 1/44; B64B 1/40; B64B 1/64; B64B 1/62; B64D 1/12; B64D 11/00; B64D 17/18; B64D 2011/0061
See application file for complete search history.

(56) References Cited

U.S. PATENT DOCUMENTS

| | | |
|---|---|---|
| 2,258,724 A | 10/1941 | Herbert et al. |
| 4,750,690 A | 6/1988 | Conn |
| 6,116,538 A | 9/2000 | Haefelfinger |
| 9,180,981 B2 | 11/2015 | Lpez |

(Continued)

FOREIGN PATENT DOCUMENTS

WO     2005016746 A1     2/2005

*Primary Examiner* — Valentina Xavier
(74) *Attorney, Agent, or Firm* — Jeffrey Schox

(57) ABSTRACT

An aerospace vehicle system, preferably including one or more capsules, and optionally including one or more propulsion modules and/or safety modules. A capsule, preferably including a pressure vessel including a structural frame and one or more windows, and optionally including a cabin. In alternate embodiments, the system can additionally or alternatively function as a terrestrial vehicle, a watercraft, and/or any other suitable vehicle. A method of operation, preferably including operating the aerospace vehicle system in flight, while maintaining a pressure differential between the pressure vessel interior and an environment surrounding the system.

21 Claims, 17 Drawing Sheets

(56) References Cited

U.S. PATENT DOCUMENTS

| | | | |
|---|---|---|---|
| 9,540,091 | B1 | 1/2017 | MacCallum et al. |
| 9,694,910 | B2 | 7/2017 | MacCallum et al. |
| 10,336,432 | B1* | 7/2019 | Farley ................. B64B 1/40 |
| 2006/0000945 | A1 | 1/2006 | Voss |
| 2015/0106138 | A1 | 4/2015 | Fisher |
| 2016/0264248 | A1 | 9/2016 | MacCallum et al. |
| 2016/0376002 | A1 | 12/2016 | Davidson |
| 2017/0129579 | A1 | 5/2017 | De Jong |
| 2017/0297724 | A1 | 10/2017 | Leidich et al. |
| 2017/0331177 | A1* | 11/2017 | MacCallum ............ B64B 1/40 |
| 2021/0237841 | A1* | 8/2021 | Farley ................. B64B 1/62 |

\* cited by examiner

AEROSPACE VEHICLE SYSTEM AND METHOD OF OPERATION

CROSS-REFERENCE TO RELATED APPLICATIONS

This application is a continuation of U.S. patent application Ser. No. 17/160,837, filed 28 Jan. 2021, which claims the benefit of U.S. Provisional Application Ser. No. 62/969,447, filed on 3 Feb. 2020, each of which is incorporated in its entirety by this reference.

TECHNICAL FIELD

This invention relates generally to the aerospace vehicle field, and more specifically to a new and useful aerospace vehicle system and method of operation.

BACKGROUND

Many typical spacecraft and other aerospace vehicles include small windows offering limited and/or partially-obstructed views outside the vehicle. Thus, there is a need in the aerospace vehicle field to create a new and useful aerospace vehicle system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
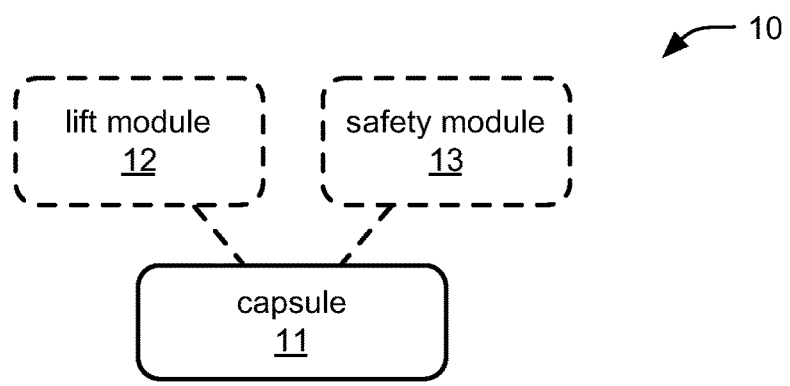
FIG. 1A is a schematic representation of an embodiment of an aerospace vehicle system.
Figure 1B:
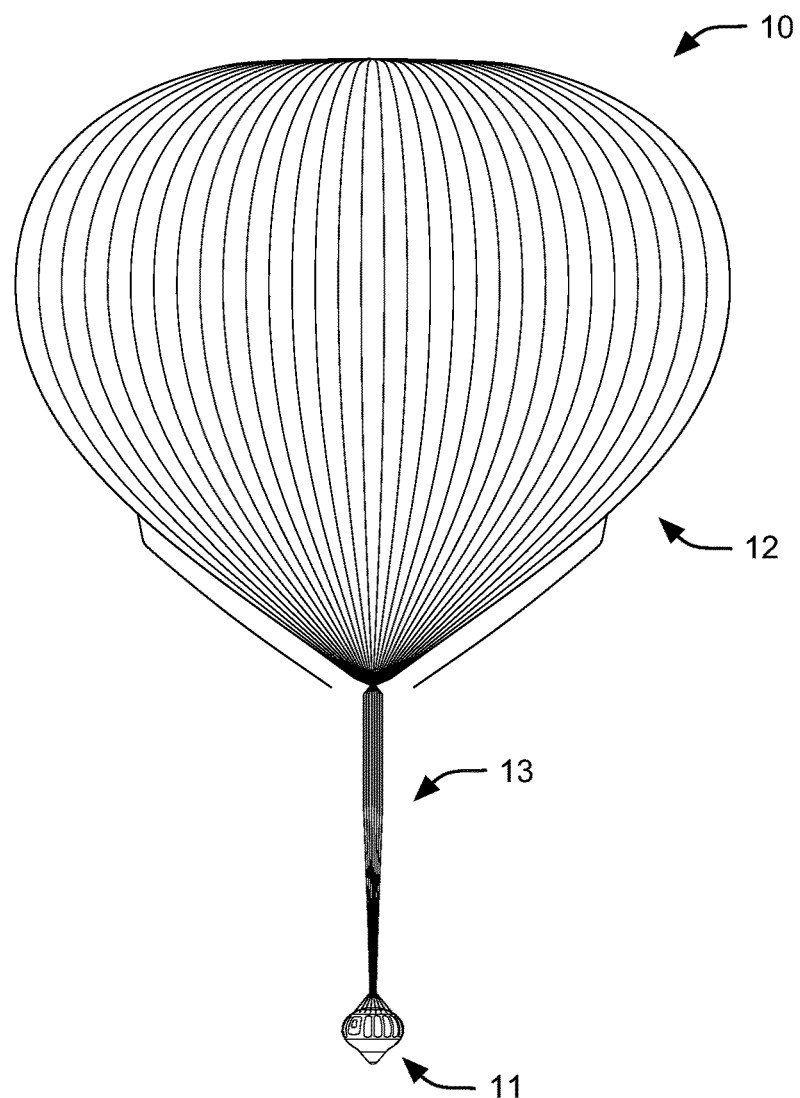
FIG. 1B is an side view of an example of the system.
Figure 2A:
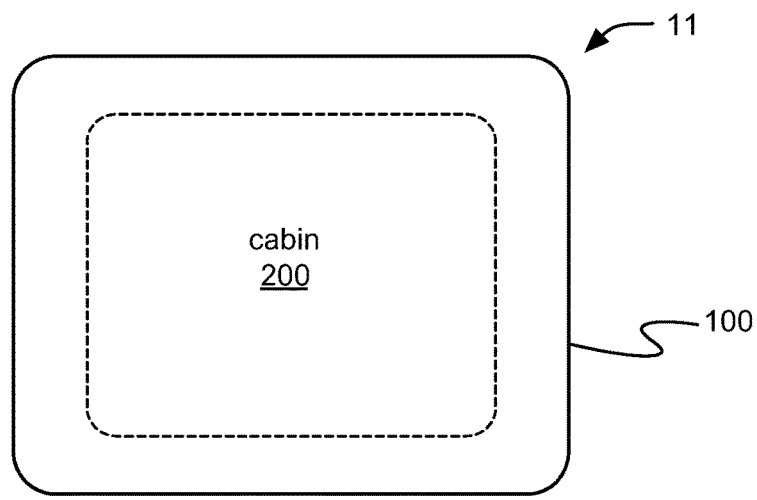
FIG. 2A is a schematic representation of an embodiment of a capsule of the system.
Figure 2B:
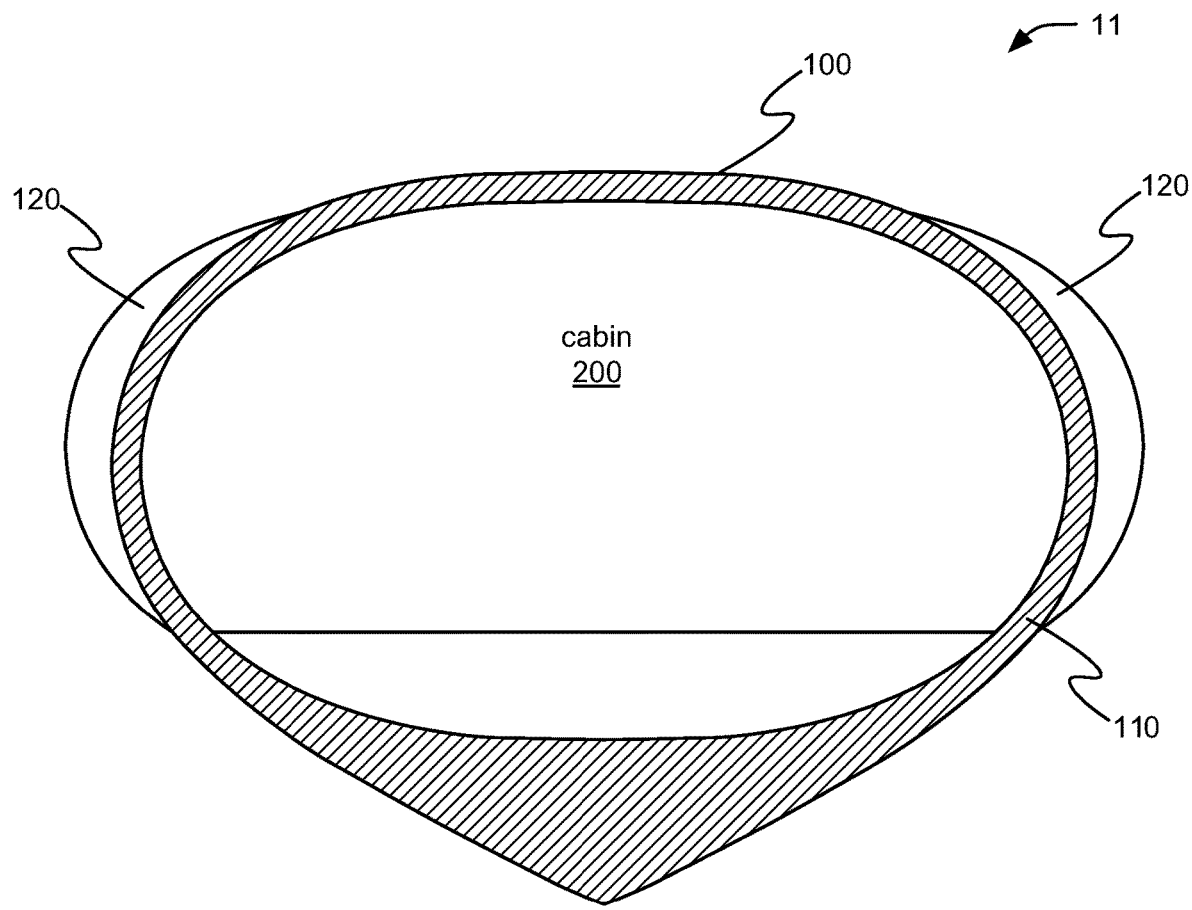
FIG. 2B is a schematic cross-sectional representation of a first example of the capsule.
Figure 3A:
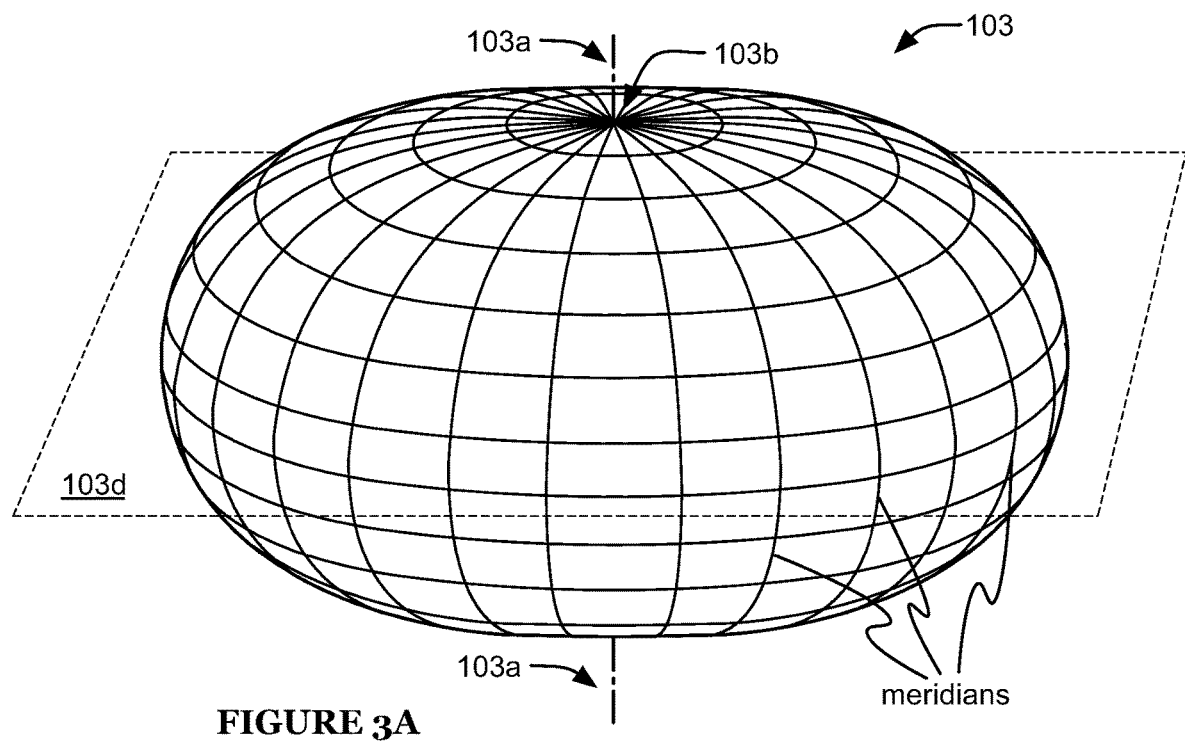
FIG. 3A is a perspective view of an example of a reference surface of the system.
Figure 3B:
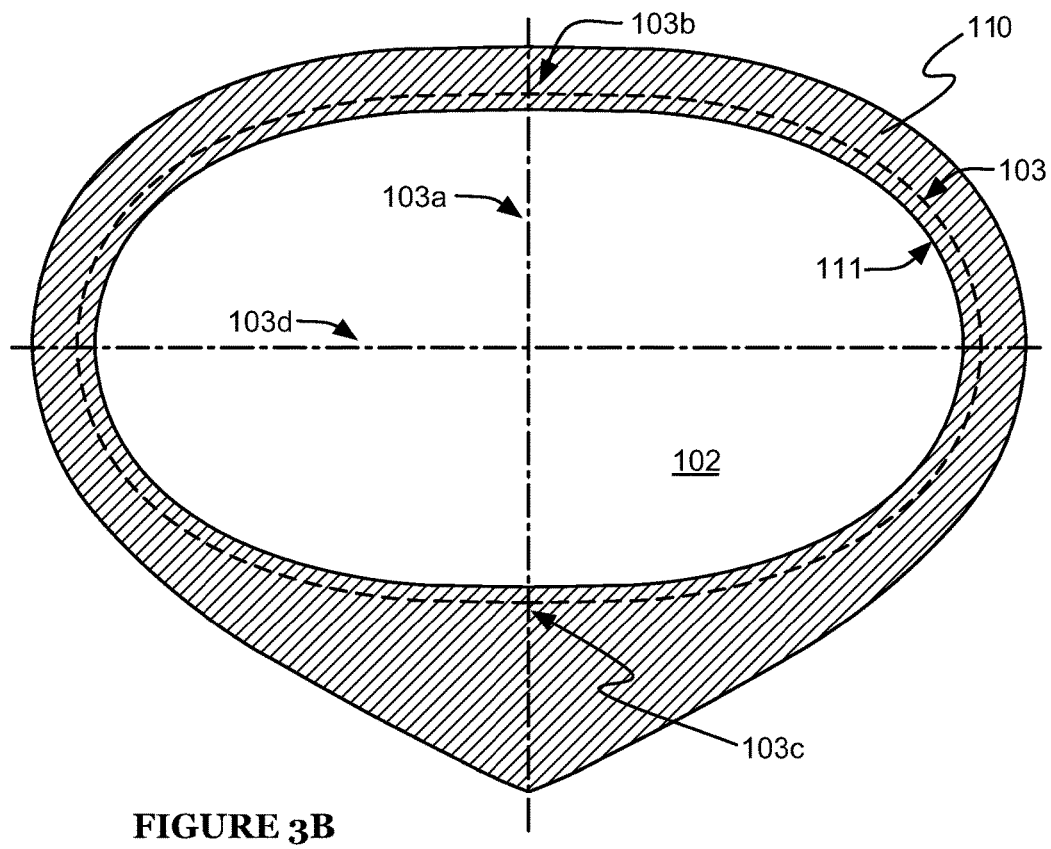
FIG. 3B is a schematic cross-sectional representation of a second example of the capsule.
Figure 3C:
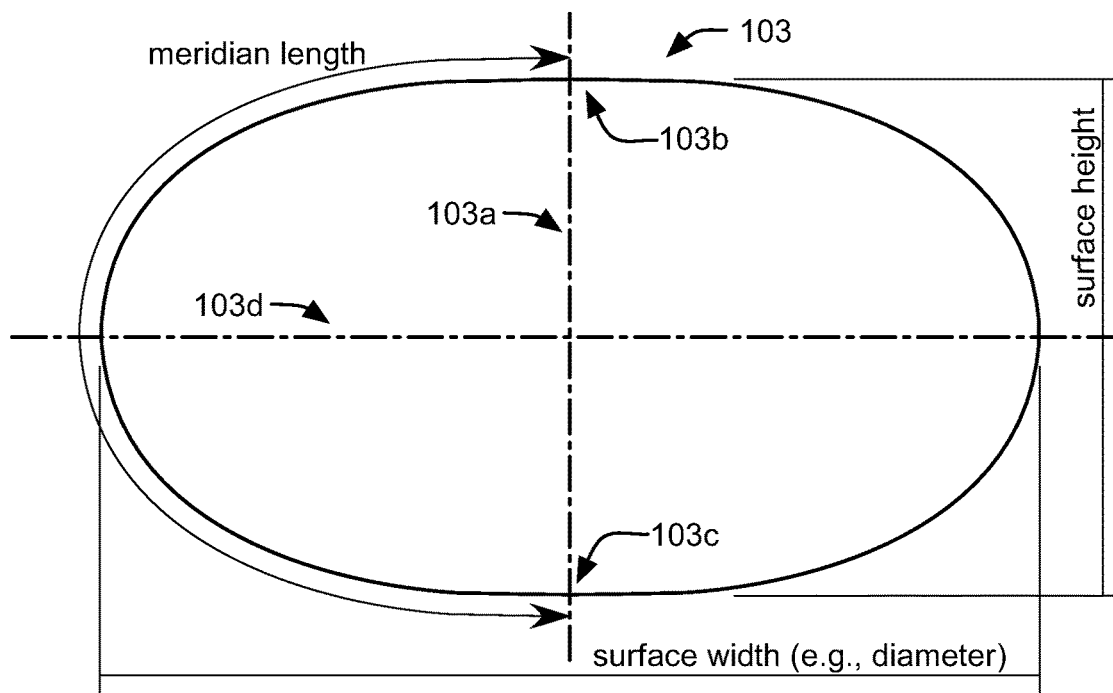
FIGS. 3C-3D are a side view and a top view, respectively, of an example of the reference surface.
Figure 3D:
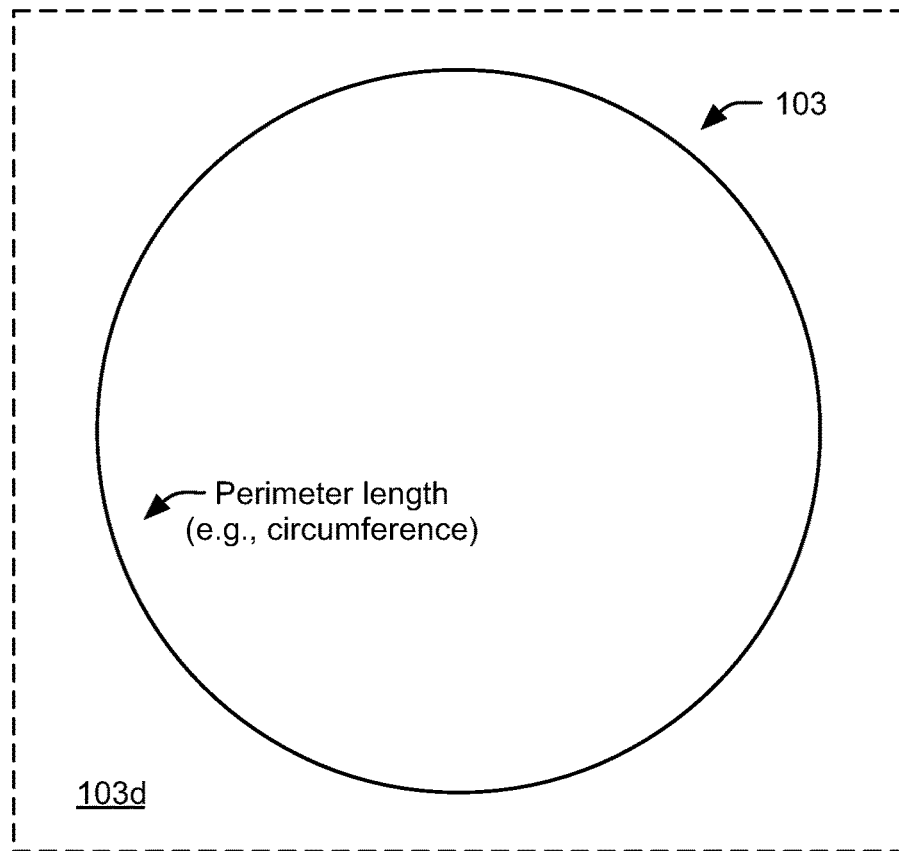
Figure 4A:
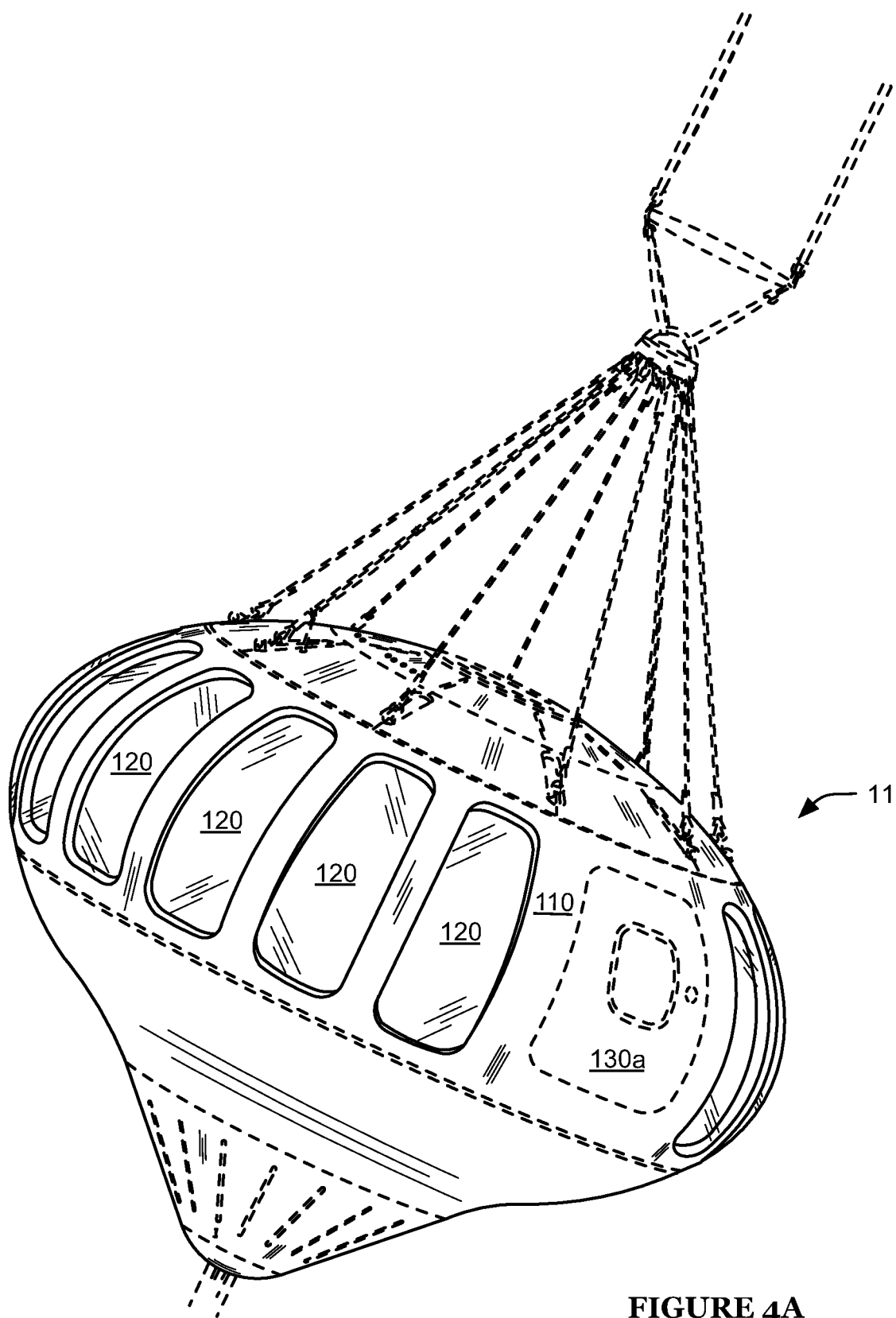
FIGS. 4A-4D are a perspective view, top view, bottom view, and side view, respectively, of a third example of a portion of the system.
Figure 4B:
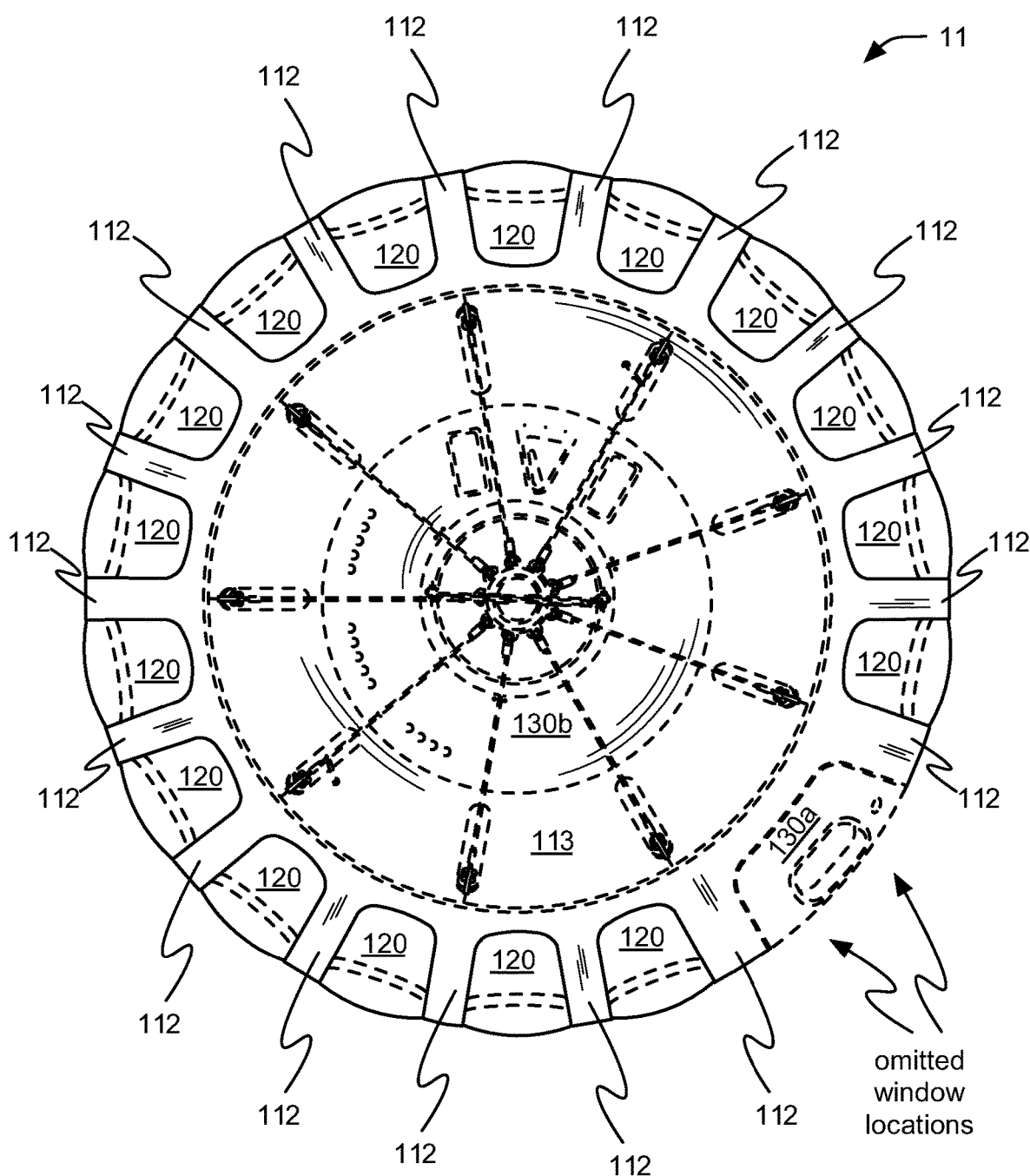
Figure 4C:
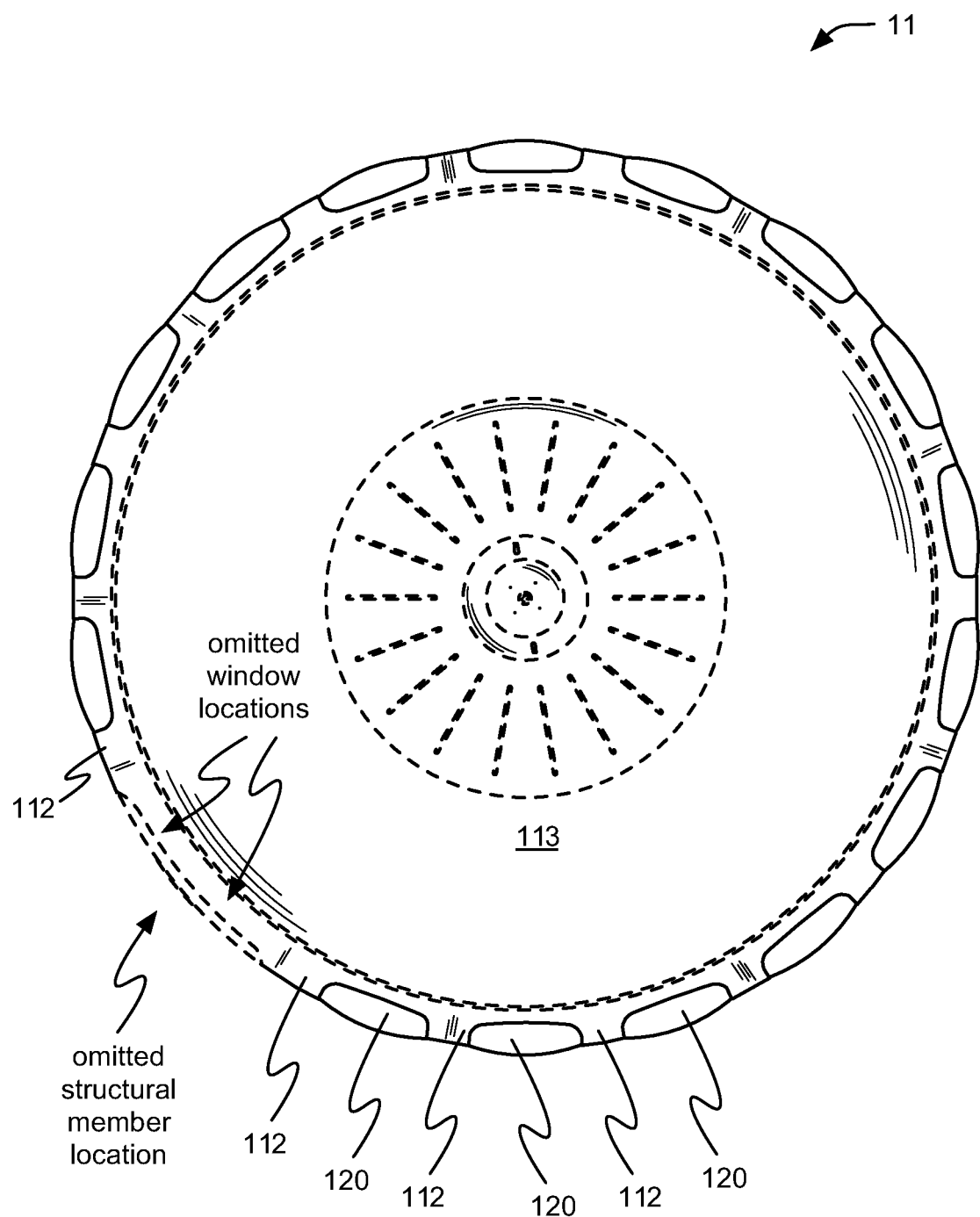
Figure 4D:
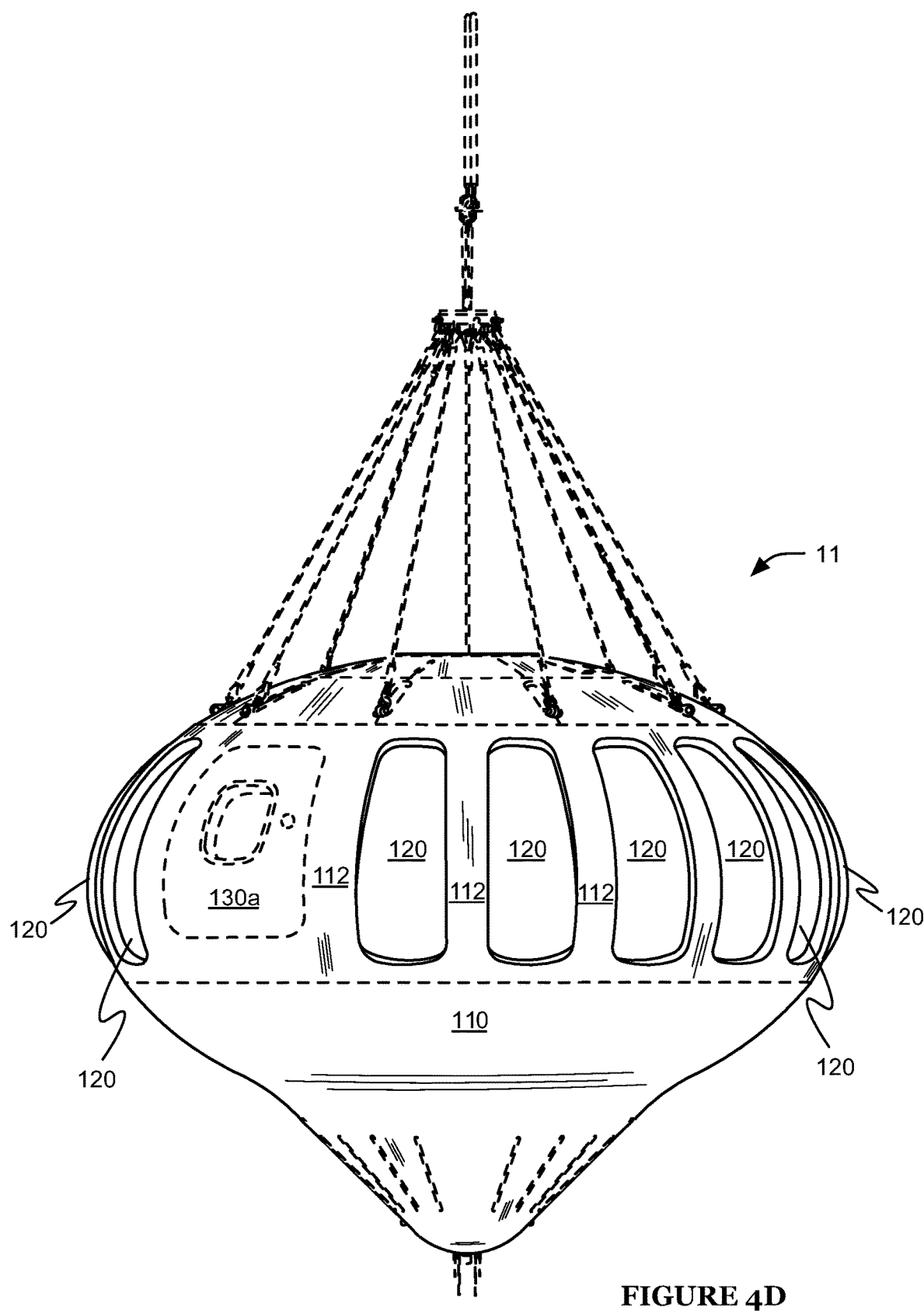
Figure 4E:
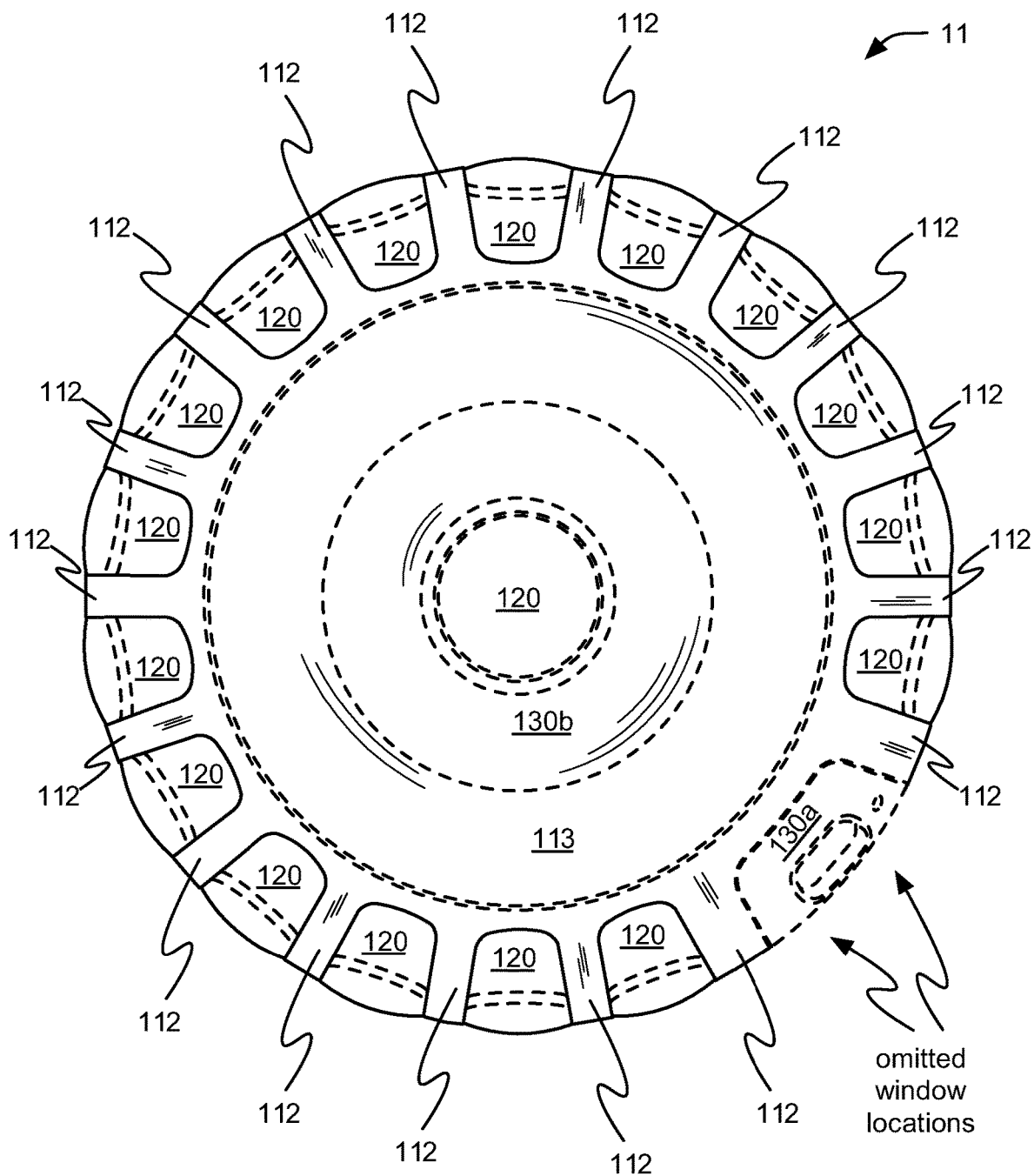
FIGS. 4E-4F are a top view and a side view, respectively, of the capsule of the example depicted in FIGS. 4A-4D.
Figure 4F:
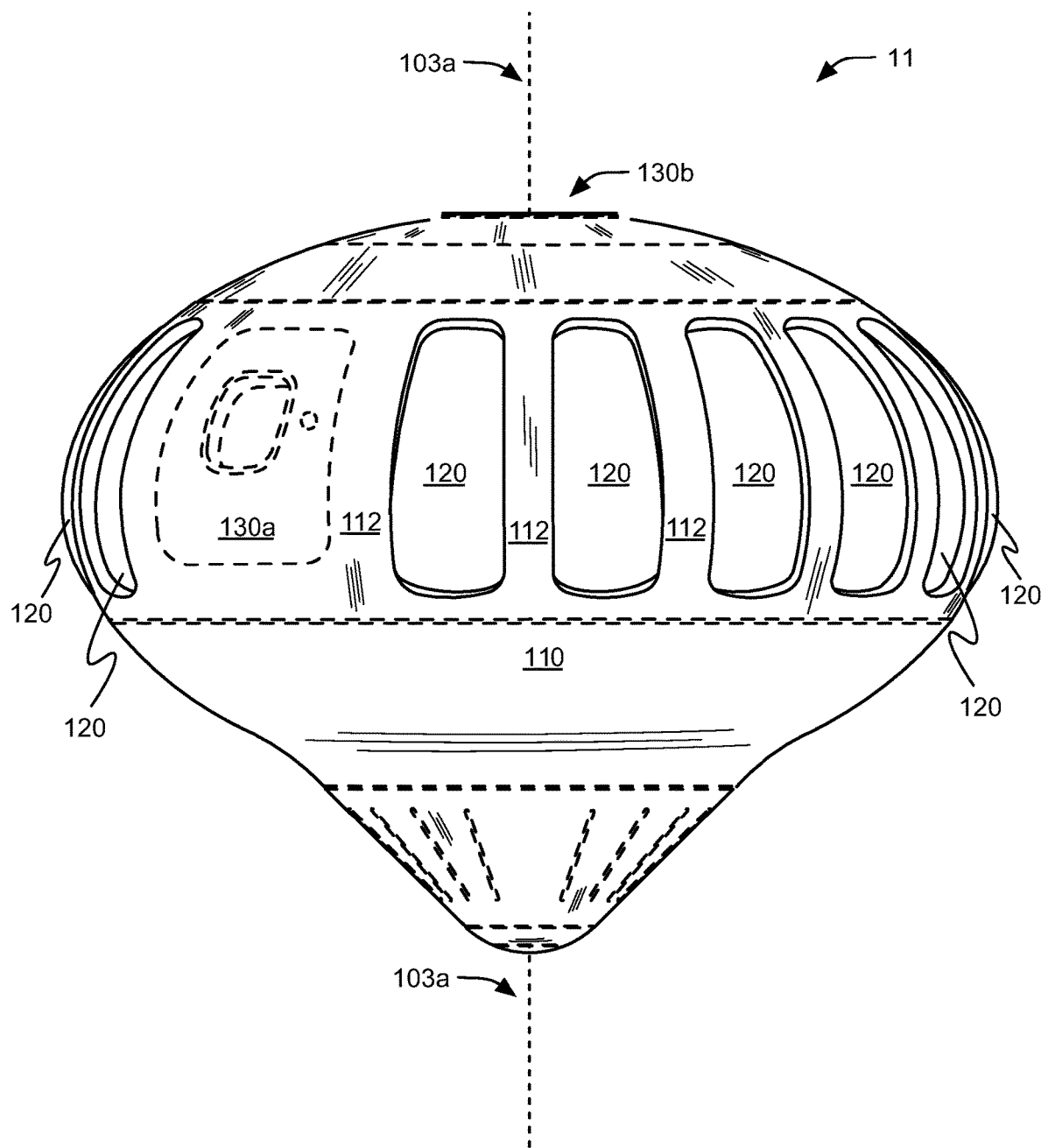

An aerospace vehicle system 10 preferably includes one or more capsules 11, and can optionally include one or more propulsion modules 12 and/or any other suitable elements (e.g., as shown in FIGS. 1A-1B). The capsule 11 preferably includes a pressure vessel 100, and can optionally include a cabin 200 and/or any other suitable elements (e.g., as shown in FIGS. 2A-2B). The system 10 is preferably a balloon-based aerospace vehicle (e.g., balloon-propelled space capsule), such as a balloon-propelled vehicle configured to operate in the stratosphere and/or any other suitable atmospheric layers. However, the system can additionally or alternatively be any other suitable lighter-than-air vehicle or aerostat (e.g., airship), space vehicle (e.g., spacecraft and/or space capsule, such as a rocket-propelled space vehicle), aerodyne (e.g., fixed- and/or rotary-wing aircraft), any other suitable aerospace vehicle, and/or any other suitable system configured to operate in a low- or no-pressure environment (e.g., low-pressure as compared with human-survivable pressures, such as environments at high altitude, in outer space, on or near extraterrestrial planetary surfaces and/or surfaces of other celestial bodies such as Mars or the Moon, etc.). In alternate embodiments, the system can additionally or alternatively function as a terrestrial vehicle, a watercraft, and/or any other suitable vehicle.

Figure 8:
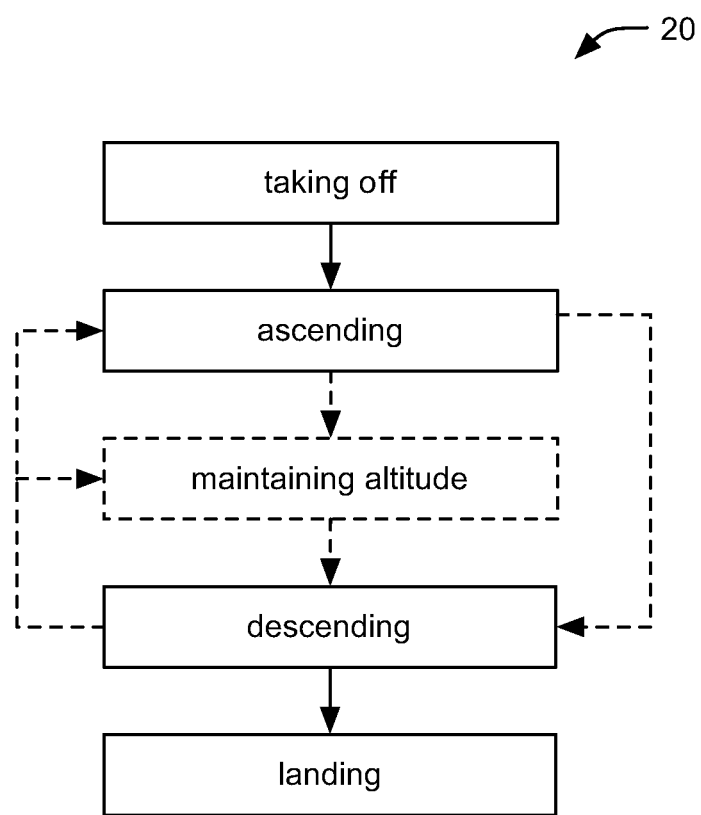
FIG. 8 is a schematic representation of an embodiment of a method of operation for the aerospace vehicle system.

A method of operation 20 is preferably performed using the aerospace vehicle system 10. The method 20 preferably includes operating the system 10 in flight, while maintaining a pressure differential between the pressure vessel interior (e.g., the cabin) and an environment surrounding the system (e.g., atmosphere, outer space, etc.), such as shown by way of example in FIG. 8.

However, the system 10 and/or method 20 can additionally or alternatively include any other suitable elements.

2. Benefits.

Embodiments of the system 10 and/or method 20 can confer one or more benefits. Embodiments of the system can limit mechanical stresses in windows of the system, such as stresses arising from pressure differentials between the vessel interior and its surroundings. Such window stress reductions can be achieved in one or more manners. In a first example, overall hoop stresses in the system can be reduced through use of structural geometries similar to elasticas and/or isotensoids. In a second example, hoop stresses (and/or stresses in other directions) in the windows can be reduced via increased window curvature (e.g., in the direction of the hoop stresses and/or other stresses to be reduced) relative to the curvature of other elements of the pressure vessel and/or to the curvature of the pressure vessel as a whole. In a third example, the pressure vessel geometry can be configured such that other stresses (e.g., pseudo-axial stresses, such as meridional stresses) are directed into structural members surrounding the windows. However, the mechanical stresses in the windows can additionally or alternatively be reduced and/or otherwise engineered in any other suitable manner.

Large windows (e.g., enabled by limiting window mechanical stresses such as described above) can offer long, unobstructed (or substantially unobstructed) vertical (e.g., meridional) viewing regions. In contrast with typical (e.g., porthole-style) windows in pressure vessels (e.g., spacecraft, stratospheric aircraft, etc.), these windows can offer superior, more immersive viewing opportunities, which can improve trip experiences for vehicle occupants. Further, due to the reduced window stresses, some embodiments can include such large windows with relatively low window thicknesses. This reduced window thickness can confer several benefits. First, reduced window thickness can result in reduced window weight (and therefore, a reduction in overall capsule weight). Second, reduced window thickness can enable favorable optical properties of the windows (e.g., reducing optical distortion, as compared with the significant optical distortion that may arise from thick windows). However, embodiments of the system and/or method can additionally or alternatively confer any other suitable benefits.

3. Aerospace Vehicle System.

As described above, the aerospace vehicle system 10 preferably includes a capsule 11, which preferably includes one or more pressure vessels 100. The pressure vessel preferably functions to isolate (e.g., fluidly isolate) a pressure vessel interior 102 from an environment surrounding the pressure vessel (e.g., atmosphere, outer space, etc.). The pressure vessel can function to maintain a positive pressure within the vessel interior relative to the environment. The pressure differential is preferably greater than 0.1 atm (e.g., substantially equal to 1 atm, such as 0.4-1.2 atm, 0.95-1 atm, etc.) but can alternatively be a smaller pressure differential and/or any other suitable pressure differential. The pressure vessel preferably defines an interior surface 101 that bounds the pressure vessel interior 102.

The pressure vessel 100 preferably includes a structural frame 110 and a set of windows 120. The pressure vessel can optionally include one or more hatches 130 and/or any other suitable elements.

3.1 Structural Frame

The structural frame 110 preferably functions to carry a majority of the mechanical loads of the pressure vessel (e.g., mechanical stresses, such as those arising from the pressure differential, from the lifting forces exerted by the propulsion module, etc.). The structural frame 110 includes a frame interior surface 111, which is a portion of the interior surface 101 and which, in cooperation with the rest of the interior surface 101, bounds the pressure vessel interior.

3.1.1 Reference Surface.

The structural frame 110 defines (e.g., substantially follows) a reference surface 103 (e.g., as shown in FIGS. 3A-3D). The reference surface is preferably defined by the frame interior surface in, wherein the frame interior surface preferably lies entirely or substantially entirely within the reference surface 103, such as wherein more than a threshold fraction of the frame interior surface (e.g., 90%, 95%, 98%, 99%, 90-95%, 95-98%, or 98-100% of the frame interior surface, etc.) lies within the reference surface. The frame interior surface 111 preferably follows or substantially follows the reference surface 103 (e.g., wherein the reference surface is displaced outward from the frame interior surface by a substantially constant distance, such as 1 mm, 2 mm, 5 mm, 1 cm, 2 cm, 5 cm, 0.1-1 mm, 1-3 mm, 3-10 mm, 1-3 cm, 3-10 cm, etc.).

In some examples, the structural frame substantially follows the reference surface within a region bounded by two planes (e.g., planes normal to the central axis), but substantially diverges from the reference surface in some or all locations outside the region. For example, the upper plane can be above the midplane and/or reference plane 103d, preferably above the top of the windows 120, and the lower plane can be below the midplane and/or reference plane 103d, preferably below the bottom of the windows 120. However, the planes can additionally or alternatively be in any other suitable locations.

The reference surface 103 defines a central axis 103a. The central axis preferably passes through (or substantially through) a center point of the capsule (e.g., capsule center of mass, geometric center of the pressure vessel interior and/or of the reference surface, etc.).

The reference surface 103 is preferably a closed surface (e.g., defining an interior volume within the surface). The reference surface is preferably convex, but can alternatively include one or more concavities. The reference surface preferably exhibits one or more symmetries. The reference surface can be symmetric about the central axis, preferably wherein the reference surface is a surface of revolution about the central axis. The reference surface can be symmetric across a midplane, preferably a midplane normal to the central axis. However, the reference surface can additionally or alternatively exhibit any other suitable symmetries.

The reference surface defines a height (e.g., along or parallel to the central axis). For example, the reference surface can intersect the central axis at a first point 103b and a second point 103c. These points can represent the top and bottom of the reference surface (wherein the central axis is taken as a vertical axis), and the reference surface height can be defined as the distance along the central axis between these points. For a surface of revolution about the central axis, these are a first and second vertex of the surface, wherein every meridian of the reference surface intersects the central axis at these vertices. In examples, the surface height is preferably 2-6 m (e.g., 2, 2.5, 3, 3.5, 4, 4.5, 5, 5.5, 6, 2-2.5, 2.5-3.5, 3.5-4.5, 4.5-6 m, etc.), such as approximately 10-14 ft. However, the surface height can alternatively be 1-2 m, less than 1 m, 6-12 m, greater than 12 m, or any other suitable height.

The reference surface defines a surface width, which is preferably a maximum width along a direction in any plane normal to the central axis. The plane for which this maximum is achieved can be referred to as the reference plane 103d. For a surface of revolution about the central axis, this width is the diameter (e.g., equal to twice the maximum distance from the central axis to the surface). If the surface is symmetric across a midplane normal to the central axis, then the surface diameter is the diameter of the intersection of the surface and the midplane (wherein this intersection defines a circle). In examples, the surface width is preferably 3-12 m (e.g., 3, 3.5, 4, 4.5, 5, 5.5, 6, 6.5, 7, 8, 9, 10, 12, 3-4.5, 4.5-6, 6-8, 8-10, 10-12 m, etc.), such as approximately 16-24 ft. However, the surface width can alternatively be 1.5-3 m, less than 1.5 m, 12-25 m, greater than 25 m, or any other suitable width.

The surface can define one or more perimeter lengths. In a first example, the perimeter length is defined as the length of the perimeter of the intersection of the reference surface with the reference plane 103d (i.e., the plane on which the surface width is defined). In a second example, the perimeter length is defined as the length of the longest perimeter of the intersection of the reference surface with any plane normal to the central axis. For a surface of revolution, this perimeter length is the circumference and is equal to $\pi$ times the surface diameter.

If the reference surface is a surface of revolution, it can define a meridian length, which is the curve length of the generatrix of the surface (e.g., a length along a meridian between the first and second vertices of the surface). The meridian length is preferably less than half the perimeter length, such as substantially equal to a threshold fraction of half the perimeter length (e.g., 0.95, 0.9, 0.85, 0.8, 0.75, 0.65, 0.5, 0.5-0.75, 0.75-0.85, or 0.85-1 times the perimeter length, etc.). However, the meridian length can alternatively be greater than half the perimeter length or can have any other suitable length.

The surface height is probably substantially less than the surface width. For example, an aspect ratio of the surface (defined as the surface height divided by the surface width) can be approximately equal to 0.6 (e.g., 0.5-0.7, 0.55-0.65, 0.58-0.6, etc.). Such an aspect ratio can function to reduce hoop stresses (e.g., stresses about the central axis, such as circumferential stresses), instead biasing stress more along curves running between the first and second points (e.g., along meridians of the surface, normal to the hoop stresses).

The reference surface is preferably a convex closed surface of revolution with a smooth (or substantially smooth) generatrix. In a first example, the surface is an Euler's elastica, which is defined as the surface having a maximum interior volume for a given meridian length (and an unconstrained diameter). The Euler's elastica has an aspect ratio of approximately 0.6. In a second example, the surface is an isotensoid which, for a uniform material, results in substantially zero hoop stresses. The isotensoid is preferably symmetric across the midplane, but can alternatively be any other suitable isotensoid. In a third example, the surface is an oblate spheroid, preferably with an aspect ratio of approximately 0.6 (e.g., 0.5-0.7, such as 0.55-0.65), but alternatively with any other suitable aspect ratio. In a fourth example, the surface is another shape of similar geometry to the shapes described above. For example, this can include shapes that deviate slightly from axial symmetry, include slight concavities, include low-angle cusps and/or other non-smooth regions, etc. Alternatively, the reference surface can be a surface of revolution with a generatrix including substantially straight edges and/or cusps, can be any other suitable ellipsoid, any other suitable isotensoid, any suitable prism (e.g., rectangular prism, octagonal prism, prism of a higher or lower order polygon, etc.), and/or any other suitable surface.

3.1.2 Structural Members.

The structural frame 110 preferably includes a set of structural members 112. The structural members (e.g., ribs) preferably run along paths directed substantially between the first and second point. The structural members are preferably arranged around the pressure vessel, such as wherein they define a majority of the reference surface in the circumferential region.

The structural members are preferably substantially equally spaced around the pressure vessel. For example, the members can have substantially equiangular spacing around the central axis and/or can be arranged with substantially equidistant spacing between the members (e.g., measured at a reference plane, such as the midplane and/or the reference plane 103*d*). In some examples, one or more members can be omitted from a regularly spaced pattern (e.g., a pattern with substantially equidistant and/or equiangular spacing); in some such examples, the structural members would define a regularly-spaced pattern, but for the absence of the omitted member or members (e.g., as shown in FIGS. 4A-4F; as described in U.S. Design patent application 29/722,951, filed 3 Feb. 2020 and titled "Space Capsule Design", and/or in U.S. Design patent application 29/722,958, filed 3 Feb. 2020 and titled "Space Capsule Window Design", each of which is herein incorporated in its entirety by this reference; etc.).

In embodiments in which the reference surface is a surface of revolution, these structural members are preferably meridional members, which can run substantially along meridians of the surface. The meridional members are preferably arranged with substantially equiangular spacing around the central axis, possibly wherein some members are omitted from such a regularly-spaced pattern (e.g., as described above).

The set of structural members preferably includes a plurality of structural members, more preferably including at least eight members (e.g., 8, 10, 12, 18, 24, 8-14, 15-25, or more than 25 members, etc.). However, the set can alternatively include 2 to 7 members (e.g., 3, 4, 6, etc.), include only one member, or include any other suitable number of structural members.

Each structural member of the set is preferably substantially identical. Alternatively, some or all of the structural members can differ from the others. For example, structural members adjacent to an omitted structural member location (e.g., location at which a member has been omitted from an otherwise regularly-spaced pattern) may differ from the other structural members.

However, the structural frame can additionally or alternatively include any other suitable structural members 112 in any suitable arrangement.

3.1.3 Hubs.

The structural members (e.g., meridional members) can meet at one or more hubs 113 of the structural frame. The hubs are preferably arranged at and/or near the first and second points 103*b,c*. In one example (e.g., in which the reference surface is a surface of revolution), the structural frame includes two hubs, one each at or near the first and second vertices of the surface (e.g., the apex and nadir). The hubs are preferably substantially circular or annular. However, the hubs can additionally or alternatively have any other suitable arrangement and/or shapes.

Figure 6:
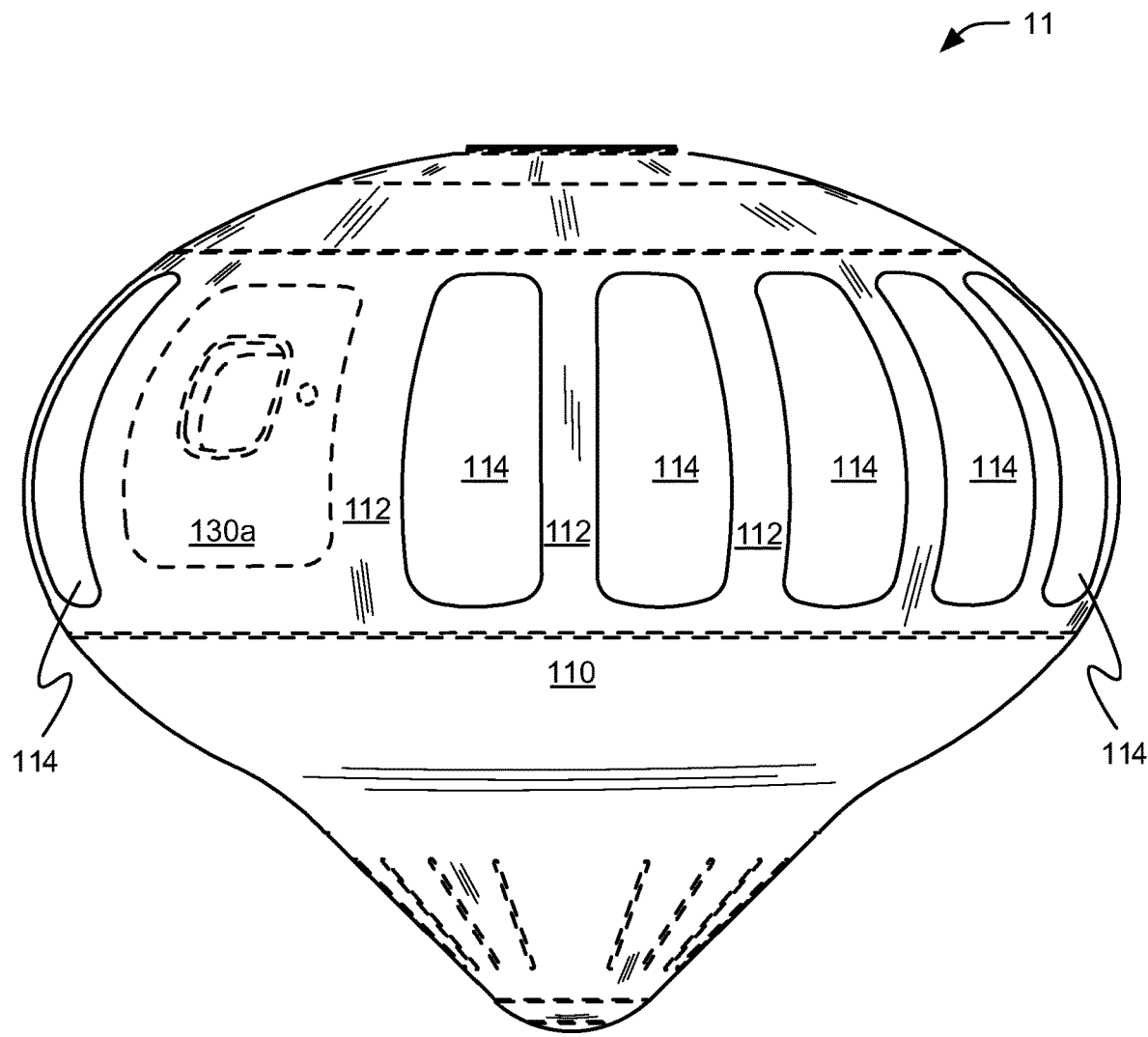
FIG. 6 is a side view of a fifth example of a portion of the capsule.

The structural frame preferably defines a set of apertures 114 (e.g., as shown in FIG. 6). Each aperture of the set is preferably bounded by two adjacent structural members (possibly in cooperation with one or more hubs and/or other elements of the structural frame). In some embodiments, each structural member (or a subset thereof) can bound two apertures (e.g., one aperture on either side of the structural member). For example, an aperture can be defined between each pair of structural members that are substantially evenly spaced (whereas no aperture is defined between structural members adjacent to an omitted structural member location). However, the apertures can have any other suitable arrangement. Each aperture is preferably substantially identical. However, some or all of the apertures can alternatively differ from the others.

The structural frame can be of unitary construction, can include multiple portions (e.g., mechanically fastened to each other), and/or can be constructed in any other suitable manner. The structural frame preferably includes (e.g., is made of) one or more structural materials, such as metals (e.g., aluminum, titanium, etc.), composites (e.g., carbon-fiber reinforced composites), and/or any other suitable materials. The material may be opaque (and/or translucent, such as translucent materials resulting in significant light attenuation and/or optical distortion), but can additionally or alternatively have any other suitable optical properties.

However, the structural frame 110 can additionally or alternatively include any other suitable elements in any suitable arrangement.

3.2 Windows

The pressure vessel preferably includes a set of windows 120. The windows can function to enable vehicle occupants to look outside the vehicle from the cabin. The windows preferably enable a high-quality, immersive viewing experience for vehicle occupants (e.g. offering views of Earth and outer space from a high altitude).

Each window 120 includes a window interior surface 121, which is a portion of the interior surface 101. The window interior surfaces bound the pressure vessel interior (in cooperation with the rest of the interior surface 1o1).

The system preferably includes a window arranged at each aperture of the structural frame (e.g., covering the aperture). However, the system can alternatively include windows only arranged at a subset of the apertures, and/or can include windows in any other suitable arrangement.

Each window is preferably attached to the structural frame at (and/or near) the aperture boundary of the respective aperture at which it is arranged. The attachment preferably forms a seal between the window and the structural frame, thereby enabling fluid isolation of the pressure vessel interior from the environment. For example, the windows can be brazed to the structural frame, can be sealed using a flexible seal material such as an elastomer, and/or can be sealed in any other suitable manner.

Each window interior surface 121 preferably defines a substantially geometrically smooth surface, but can alternatively include edges, vertices, and/or any other suitable geometrical features.

Each window 120 (e.g., the window interior surface 121 thereof) preferably has greater outward curvature than other elements of the pressure vessel, such as the reference surface and/or structural frame. Here, outward curvature indicates curvature outward from the pressure vessel interior (e.g., curvature away from the central axis, away from a center of the reference surface, etc.). For example, the window interior surface can extend outside the reference surface, such as wherein the window interior surface is inside the reference surface near the window edge (e.g., near the aperture boundary), and is outside the reference surface near the center of the window, crossing the reference surface between the center and the edge (e.g., as shown in FIGS. 4A-4F and/or 7A-7B).

Figure 7A:
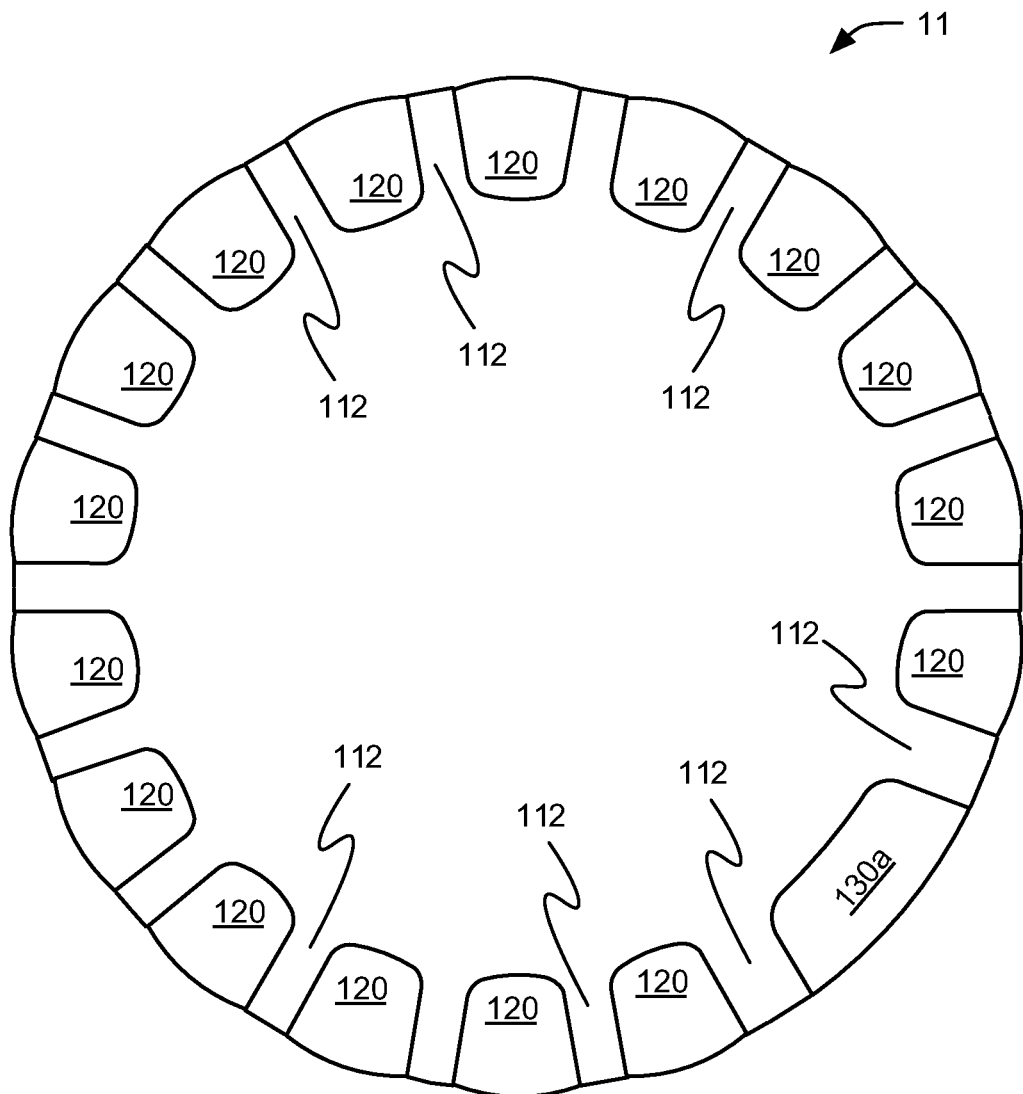
FIG. 7A is a top view of a sixth example of the capsule.
Figure 7B:
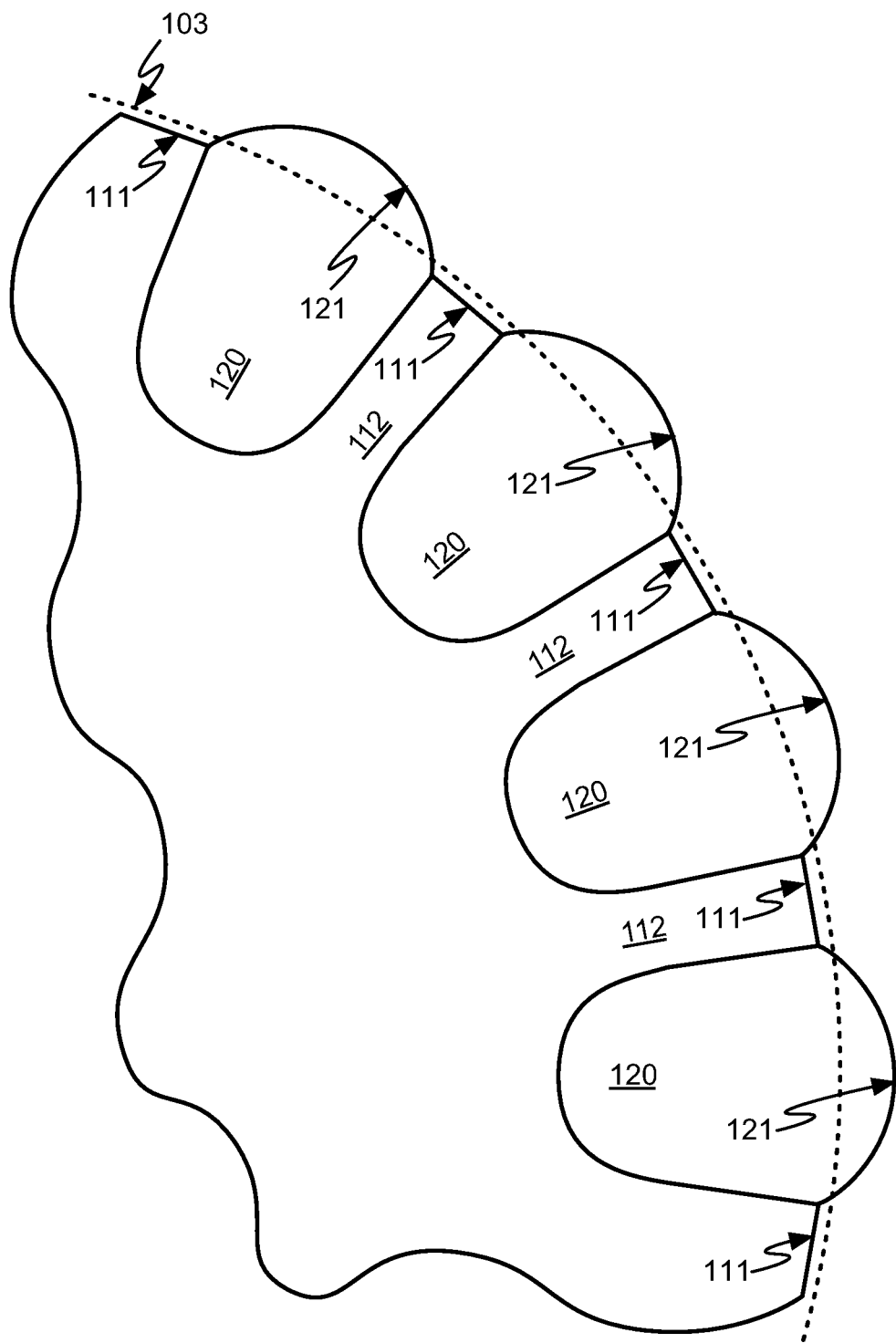
FIG. 7B is a top view of a seventh example of a portion of the capsule.

This window curvature preferably includes increased curvature (e.g., relative to the reference surface and/or structural frame) along a circumferential direction (e.g., about the central axis). The circumferential window curvature of the window can be greater than the circumferential surface curvature of the reference surface (e.g., along a plane, such as the midplane, the reference plane 103d at which the reference surface width is defined, any other suitable plane normal to the central axis, etc.), such as shown by way of example in FIG. 7A-7B; accordingly, in some examples, the pressure vessel can define a "pumpkin-like" shape. The intersection of this plane with the window interior surface can define a circumferential radius of curvature of the window. This circumferential radius of curvature is preferably less than (e.g., substantially less than) the radius of curvature of the reference surface in this plane (e.g., less than half the reference surface diameter).

In some examples, this increased curvature can continue (e.g., meridionally) above and/or below one or more of the windows. For example, the structural frame can define a bulged region above and/or below each window (or a subset thereof), wherein the bulged region has greater curvature than the overall pressure vessel curvature (e.g., shorter radius of curvature than the distance from the bulged region to the central axis, bulged region extends outside the reference surface, etc.); in this example, the increased curvature of the bulged regions is preferably lesser than the increased curvature of the windows (e.g., wherein the bulged regions do not extend as far outside the reference surface as the windows do).

Additionally or alternatively, this increased curvature can continue (e.g., circumferentially) to one or both sides of one or more of the windows. For example, a structural member can include a portion that curves outward from the overall pressure vessel curvature (e.g., extending outside the reference surface) to meet the window. In one example, a cross-section of the structural member (on planes normal to the central axis, such as on the reference plane 103d) can substantially define a 'U' or 'V' shape, including a first portion extending outward toward a window on a first side of the member, a second portion extending outward toward a window on a second side of the member opposing the first side, and optionally a central portion (between the first and second portions) that substantially follows the reference surface. However, the windows can additionally or alternatively exhibit any other suitable circumferential curvature.

In some embodiments, due to this increased circumferential curvature, the load on the windows (e.g., due to differential pressure between the pressure vessel interior and the environment) results mostly in hoop stresses in the windows (e.g., low or substantially no meridional stresses in the windows). These hoop stresses can be transferred into the structural frame (e.g., into the structural members adjacent to the window) at the window boundary, thus concentrating the load in the structural frame (and, accordingly, reducing the overall load in the windows). In examples, much of this load is carried by the structural frame (e.g., structural members) as meridional stresses. Additionally or alternatively (e.g., in examples in which a structural member is arranged between two windows that it adjoins, such as wherein the structural member and two windows define a substantially symmetric arrangement across a midplane of the structural member that separates one window from the other), the loads transferred from the two windows into the structural member can (partially or entirely) balance out.

Such a bias toward window hoop stresses rather than meridional stresses can be particularly beneficial in examples in which the windows have a high (e.g., substantially greater than unity) aspect ratio between a height dimension (e.g., window height, meridional or pseudo-axial window length, etc.) and a width dimension (e.g., circumferential window length, window width, etc.). In such examples, the hoop stresses (e.g., running along the width dimension) build up over less length than the meridional stresses (e.g., running along the height dimension) before reaching (e.g., and being transferred to) the structural frame. This can result in a lower peak stress for a given window load (e.g., given pressure differential), as compared with a window in which more of the load results in meridional stresses rather than hoop stresses.

Figure 7C:
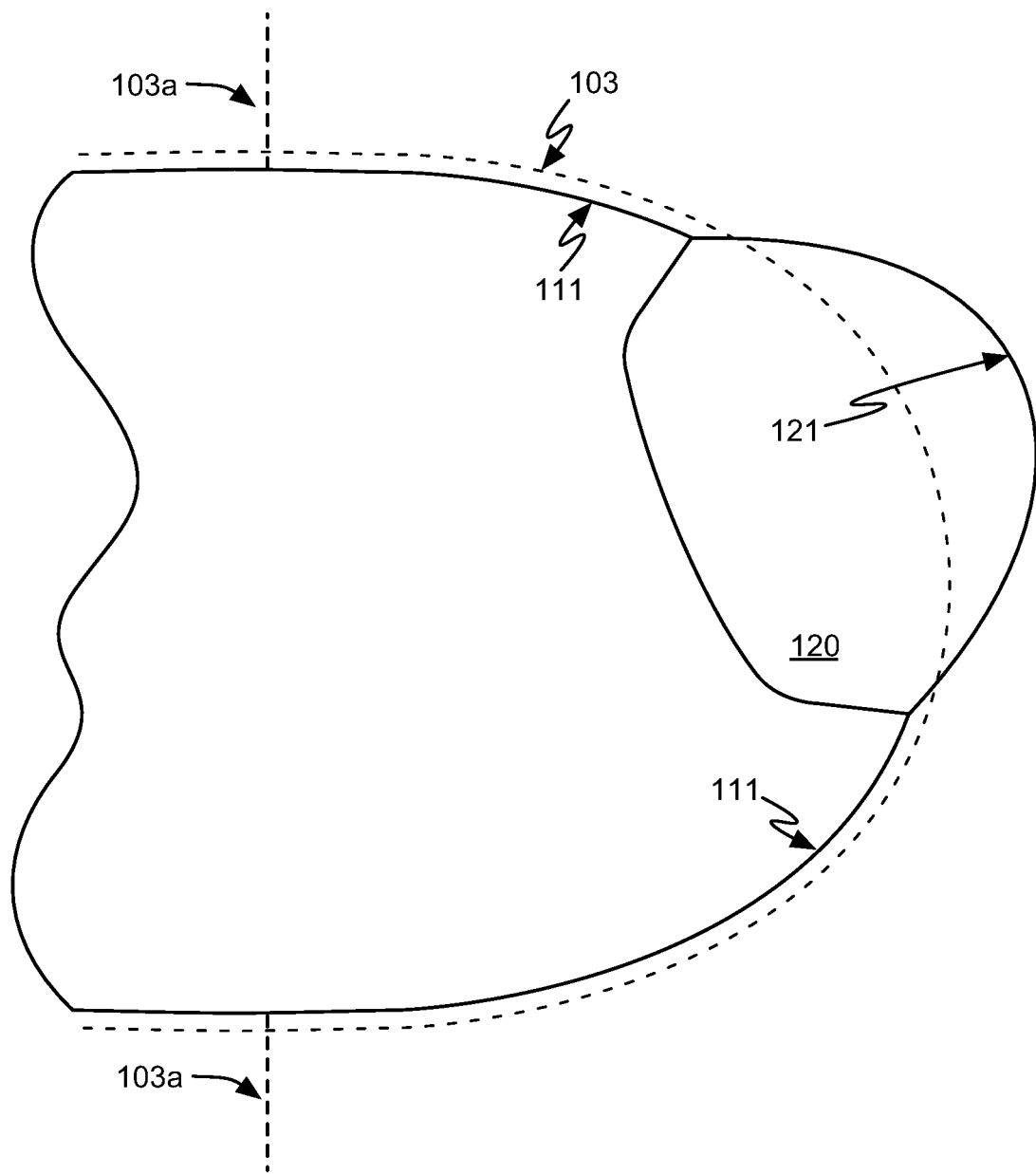
FIG. 7C is a side view of an eighth example of a portion of the capsule.

The windows can additionally or alternatively exhibit increased curvature (e.g., relative to the reference surface and/or structural frame) along a pseudo-axial direction (e.g., meridional direction). The pseudo-axial direction is preferably directed along the reference surface 103 and/or interior surface 101 in a direction normal to the circumferential direction (e.g., along a meridian of the reference surface). The window can exhibit increased curvature (e.g., decreased radius of curvature) analogous to that described above with respect to the circumferential curvature, but defined on a plane that includes (or is parallel to) the central axis (e.g., a meridian plane), such as shown by way of example in FIG. 7C. This plane is preferably a plane that substantially bisects the window, but can alternatively be any other suitable plane that intersects the window. However, the windows can additionally or alternatively exhibit any other suitable curvature along one or more pseudo-axial (e.g., meridional) directions and/or any other suitable directions.

The total extent of curvature of a window along a direction can be defined based on a change in direction of a vector normal to the window (e.g., normal to the window interior surface) at or near different points on the aperture boundary (when the curvature direction runs between the two points being compared). For example, the extent of window curvature in the circumferential direction can be defined based on points lying on a plane normal to the central axis (e.g., the midplane, a plane substantially bisecting the window, etc.), and the extent of window curvature in the pseudo-axial (e.g., meridional) direction can be defined based on points on a plane that includes (or is parallel to) the central axis (e.g., a meridian plane of the reference surface), preferably a plane that substantially bisects the window. The extent of window curvature in each of these directions can be between 0-180° (e.g., 0-30, 30-45, 45-60, 60-75, 75-90, 90-120, 120-150, and/or 150-180°, etc.), but can alternatively be greater than 180°.

The windows preferably exhibit low optical distortion, such as wherein there is no significant distortion of views of far-off objects (e.g., the Earth, Earth's horizon, celestial objects in outer space, etc.) when viewed through the window by occupants of the vehicle. This can be achieved through appropriately low window thickness, curvature, and/or index of refraction, and/or achieved in any other suitable manner.

The pressure vessel is preferably configured such that some or all mechanical stresses (e.g., stresses arising due to a pressure differential between the pressure vessel interior and the environment surrounding the pressure vessel) are low, such as being lower (e.g., much lower) in the windows than in the structural frame. This minimization of window stress can be achieved by one or more design aspects of the pressure vessel.

Hoop stresses (e.g., stresses in a circumferential direction around the central axis) can be low in the entire pressure vessel due to the reference surface shape (e.g., low aspect ratio, such as approximately 0.6; similarity to geometric shapes described above such as isotensoids and/or Euler's elastica; etc.). Further, the increased circumferential window curvature (e.g., as compared with curvature of the reference surface and/or structural members) can result in further reduction of hoop stresses in the windows (as compared with the structural members and/or other elements of the structural frame). For example, the hoop stress in a window can be substantially less than the hoop stress in the structural members adjacent to the window (e.g., the maximum hoop stress in each window can be substantially less than the average hoop stress in the entire structural frame, in the structural members adjacent to the window, in regions of the structural members that fall between reference planes bounding the windows such as the reference planes normal to the central axis, and/or in any other suitable elements).

Additionally or alternatively, the pseudo-axial (e.g., meridional) stresses can be low in the windows due to increased window curvature (e.g., increased curvature in the pseudo-axial direction, such as increased meridional curvature), as compared with curvature of the reference surface and/or structural members. In one example, the overall stress in the windows is compared with that of the structural members between two reference planes normal to the central axis. The reference planes preferably intersect the windows (e.g., at or near the top and bottom of the windows). In this example, the overall stress in a window can be substantially less than in the structural members adjacent to the window (e.g., where the maximum stress in each window is substantially less than the average stress in the adjacent structural members between the reference planes). However, the pressure vessel can additionally or alternatively exhibit any other suitable mechanical stresses and/or geometrical aspects configured to reduce mechanical stresses in the windows.

The windows can exhibit any suitable dimensions. The window dimensions are preferably indicative of size metrics of the window interior surface, but can alternatively be indicative of size metrics of the window exterior surface, a reference surface between the interior and exterior surfaces, such as halfway in between, and/or any other suitable aspects of the window.

The window height is preferably defined along a direction parallel to the central axis (e.g., is equal to the length of the orthogonal projection of the window onto the central axis). The window height is preferably greater than a threshold fraction of the reference surface height (e.g., 5%, 10%, 15%, 20%, 25%, 30%, 35%, 45%, 60%, 75%, 3-10%, 10-25%, 25-40%, 40-60%, 60-80%, less than 5%, greater than 80%, etc.). The window height can be greater than 0.3 m, such as 0.5-3 m (e.g., 0.5-1, 1-1.5, 1.25-1.75, 1.5-2, or 2-3 m, etc.) or greater than 3 m, but can alternatively be any other suitable height.

The pseudo-axial (e.g., meridional) window length is preferably defined along a plane including (or parallel to) the central axis (e.g., a meridian plane). This plane can be a plane that bisects the window, can be the plane for which this pseudo-axial length metric is maximized, and/or can be any other suitable plane. The pseudo-axial (e.g., meridional) window length is preferably greater than a threshold fraction of the reference surface height and/or meridian length (e.g., 5%, 10%, 15%, 20%, 25%, 30%, 35%, 45%, 60%, 75%, 3-10%, 10-25%, 25-40%, 40-60%, 60-80%, less than 5%, greater than 80%, etc.). The pseudo-axial (e.g., meridional) window length can be greater than 0.5 m, such as 0.75-5 m (e.g., 0.75-1.5, 1.25-2, 1.5-2.5, 2-3, 3-5 m, etc.) or greater than 5 m, but can alternatively be any other suitable length.

The circumferential window length (e.g., window width) is preferably defined along a plane normal to the central axis (e.g., midplane, reference plane 103d used for determination of reference surface width, plane that bisects the window, etc.). The circumferential window length can be greater than a threshold fraction of the reference surface perimeter length (e.g., 1%, 2%, 3%, 5%, 8%, 10%, 15%, 1-3%, 2-5%, 3-10%, 5-15%, etc.). The circumferential window length can be less than the threshold fraction of the window height (e.g., 10%, 20%, 30%, 40%, 50%, 60%, 75%, 5-15%, 10-30%, 20-50%, 30-60%, 50-80%, etc.). The circumferential window length can be greater than 0.1 m, such as 0.2-2 m (e.g., 0.2, 0.3, 0.5, 0.75, 1, 1.25, 1.5, 2, 0.2-0.5, 0.5-1, or 1-2 m, etc.) or greater than 2 m, but can alternatively be any other suitable length. In some examples, the window width can be substantially greater than a member width (e.g., distance between windows through the structural member) of the structural members that are adjacent to the window, such as greater by at least a threshold factor (e.g., 1.1, 1.2, 1.3, 1.5, 2, 2.5, 3, 4, 5, 10, 1-1.25, 1.25-1.75, 1.75-2.5, 2.5-5, 5-10, and/or 10-30 times greater, etc.); alternatively, the window width can be substantially equal to the member width, less than the member width, and/or have any other suitable relation to the member width.

However, the windows can additionally or alternatively have any other suitable size in any suitable dimensions.

The windows preferably include (e.g., are made of) one or more transparent or translucent materials (e.g., oxides, polymers, etc.). The windows preferably exhibit similar thermal expansion properties as the structural frame. For example, during vehicle use (e.g., flight process from ground level to high altitude and back down, such as described below regarding the method 20), the vehicle may undergo significant temperature changes. For example, the temperature may change from a typical ground temperature (e.g., 0-45° Celsius) to a far lower temperature at higher altitudes (e.g., far below 0° C., such as −40 to −80° C.) and then back to a typical ground temperature over the course of a flight. Mismatch in thermal expansion between different elements of the pressure vessel (e.g., the windows and structural frame) can be accommodated by the seal between these elements (e.g., accommodated by a flexible seal, such as a seal including elastomeric material) and/or accommodated in any other suitable manner.

In some examples, the windows can include one or more coatings, such as mechanical and/or optical coatings. For example, the windows can include an optical coating (e.g., metal coating such as gold) to attenuate sunlight.

However, the pressure vessel can additionally or alternatively include any other suitable windows and/or other elements in any suitable arrangement.

3.3 Hatches

The pressure vessel can optionally include one or more hatches 130. The hatches can function to enable ingress and/or egress (e.g., of humans and/or other occupants, cargo, etc.). The pressure vessel preferably includes a primary hatch 130a. The primary hatch is preferably arranged along the circumference (e.g., near the midplane or reference plane 103d) of the pressure vessel. For example, the primary hatch can be located in the place of one or more windows and/or structural members (e.g., windows and/or structural members omitted from a regular pattern). In a specific example in which the pressure vessel includes a regular array of meridional members and windows, one meridional member and the two windows adjacent to it are omitted from the otherwise regularly spaced arrangement, and the primary hatch 130a is arranged substantially in the location of these omitted elements (e.g., as shown in FIGS. 4A-4F). The pressure vessel can optionally include one or more secondary hatches 130b (e.g., emergency or secondary egress hatches), such as hatches arranged at or near vertices of the pressure vessel (e.g., at the apex). However, the pressure vessel can additionally or alternatively include any other suitable hatches in any suitable arrangement.

3.4 Cabin

The capsule can optionally include a cabin 200. The cabin can function to carry occupants (e.g., live occupants such as live humans) within the vehicle and to maintain conditions necessary for occupant health, safety, and/or comfort. The cabin is preferably arranged within the pressure vessel interior (e.g., wherein the pressure vessel maintains a breathable atmosphere inside the pressure vessel interior, even in low-pressure environments unsuitable for sustaining human life).

Figure 5A:
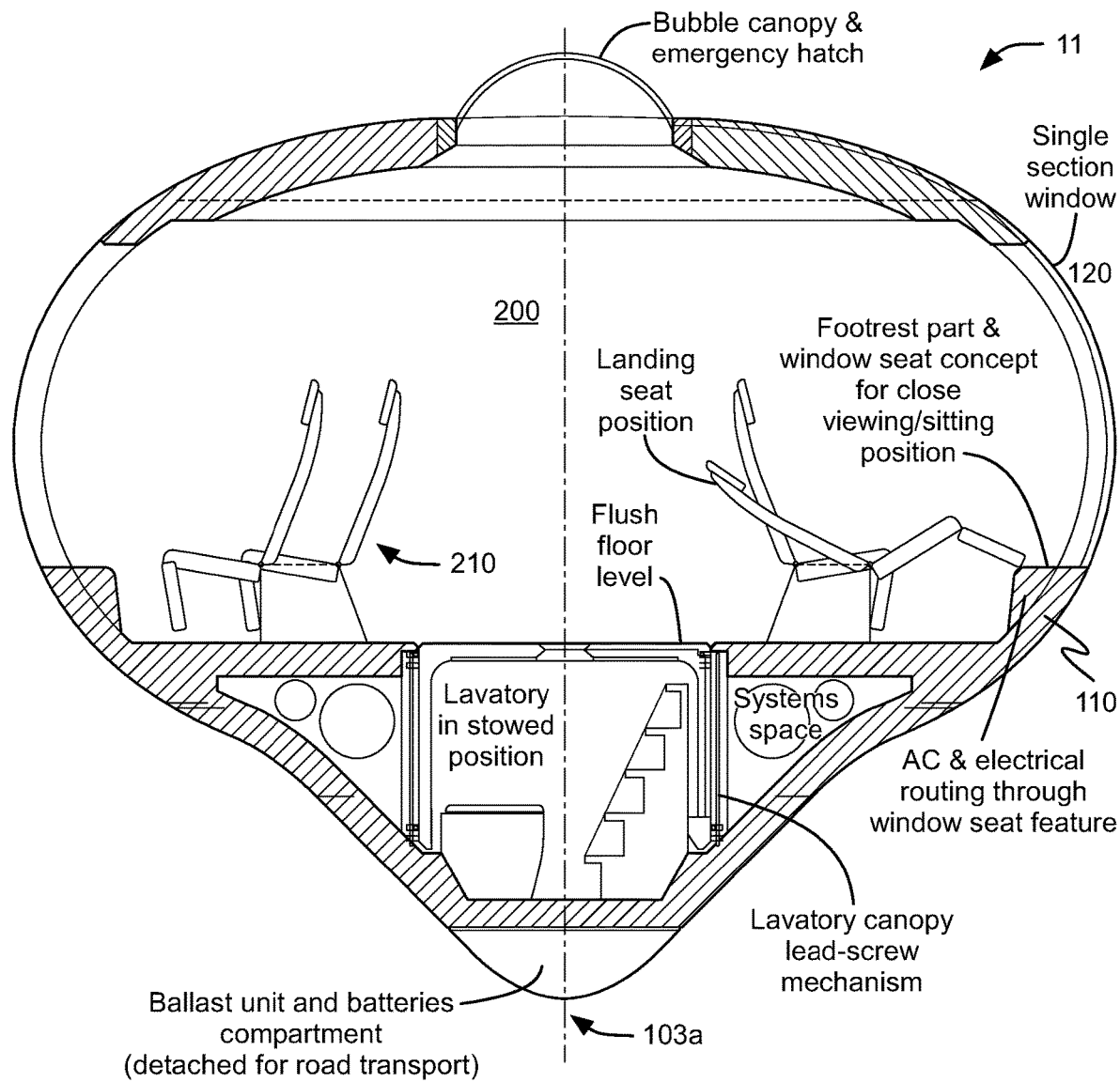
FIG. 5A is a cross-sectional side view of a fourth example of the capsule.
Figure 5B:
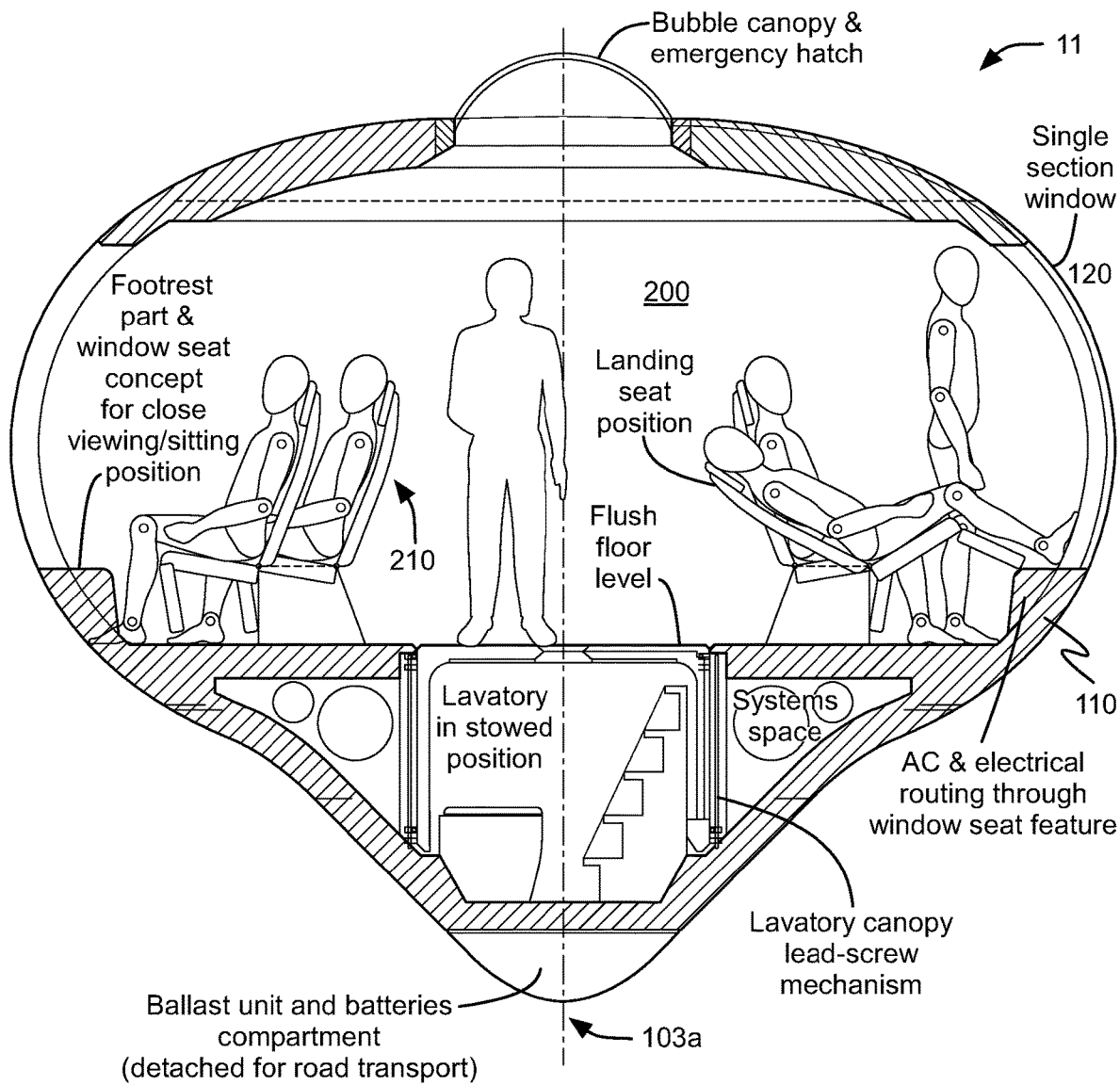
FIG. 5B is a cross-sectional side view of a specific example of the capsule depicted in FIGURE SA.

The cabin can include one or more human supports 210 (e.g., seats). Each human support is preferably configured to orient a human occupant (e.g., the face and/or eyes of the occupant) toward a window of the pressure vessel (e.g., toward the window closest to the human support). For example, each human support 210 can be arranged between the central axis and a window (preferably a different window for each human support), such as shown by way of example in FIGS. 5A-5B (wherein dimensions are shown in FIG. 5B to illustrate a specific example, but a person of skill in the art will recognize that an analogous example could include any other suitable dimensions). In this example, the human supports (e.g., seats) are preferably arranged facing the respective window with which they are aligned, but can additionally or alternatively have any other suitable arrangement. In a specific example, the cabin includes a set of seats 210 arranged around the cabin (e.g., regularly spaced around the cabin). In this specific example, each seat is preferably arranged (e.g., mechanically secured to the capsule, such as to a floor of the cabin) near and facing toward a different window of the pressure vessel. In some examples, the cabin can include one or more seats such as described in U.S. Provisional Patent Application 62/969,447, filed 3 Feb. 2020 and titled "Space Capsule", which is herein incorporated in its entirety by this reference (e.g., as described in U.S. Provisional Patent Application 62/969,447 regarding the 'Seating, lavatory, and layout').

However, the human supports can additionally or alternatively have any other suitable functionality and/or arrangement, and/or the cabin can additionally or alternatively include any other suitable elements in any suitable arrangement.

3.5 Propulsion Module

The propulsion module 12 of the aerospace vehicle system preferably functions to provide a propulsive force. For example, the propulsion module can provide a lifting force, such as a force substantially opposing the force of gravity exerted on the system. For example, the propulsion module can function to increase system altitude, substantially maintain system altitude, slow system descent, and/or otherwise provide lift to the system. However, the propulsion module can additionally or alternatively function to propel the system into Earth orbit, sub-orbital trajectory, and/or trajectory into outer space, control system trajectory (e.g., perform station keeping, change system trajectory, control system landing and/or de-orbiting, etc.), increase and/or decrease system velocity, heading, and/or orientation, and/or otherwise propel the system. The propulsion module can include one or more elements such as described in U.S. Provisional Patent Application 62/969,447, filed 3 Feb. 2020 and titled "Space Capsule", which is herein incorporated in its entirety by this reference (e.g., as described in U.S. Provisional Patent Application 62/969,447 regarding the 'Balloon System').

The propulsion module preferably includes a balloon, but can additionally or alternatively include any other suitable elements. The propulsion module (e.g., balloon) preferably contains a low-density gas (e.g., hydrogen, helium, etc.). The low-density gas is preferably less dense than the environment surrounding the system (e.g., the atmosphere). The balloon can be a zero pressure balloon, a super pressure balloon, and/or any other suitable balloon. In some examples, the propulsion module includes multiple balloons.

The propulsion module is preferably attached (e.g., tethered) to the pressure vessel. The propulsion module is preferably attached to the pressure vessel near the first or second point (e.g., upper extremities, such as apex) of the pressure vessel. The propulsion module is preferably attached to the structural frame, such as at or near one or more of the structural members and/or hubs. For example, the propulsion module can be tethered to the pressure vessel along one or more meridians of the pressure vessel (e.g., at one or more structural members, at a hub and meridionally aligned with one or more structural members, etc.). The propulsion module is preferably tethered to the pressure vessel with multiple attachments, such as attachments arranged substantially rotationally symmetrically about the center of mass of the capsule (e.g., about the central axis).

For example, the propulsion module can be tethered to the capsule at regular spacing with respect to the pressure vessel structural members (e.g., attached to or above alternate meridional members of the pressure vessel, such as shown by way of example in FIG. 4A-4D). However, the propulsion module can additionally or alternatively the coupled to the capsule in any other suitable manner.

In alternate embodiments, the propulsion module can additionally or alternatively include one or more reaction engines (e.g., rockets, jet engines such as airbreathing jet engines, ion drives, etc.), propellers, and/or any other suitable elements configured to propel an aerospace vehicle. In such embodiments, the propulsion module is preferably mechanically coupled to other elements of the system (e.g., to the pressure vessel) in a manner typical for the particular type of propulsion element(s) in use. For example, in such embodiments, the propulsion module can be mechanically coupled to the pressure vessel via a substantially rigid coupling, but can alternatively be tethered to the pressure vessel (e.g., wherein propulsive force is delivered to the pressure vessel via tension on the tether) and/or coupled in any other suitable manner. In some examples, the propulsion module (e.g., rocket) is mechanically coupled to the pressure vessel during an initial portion of system flight (e.g., during which a flight trajectory, such as an orbital trajectory or a trajectory toward or substantially toward a celestial body, is achieved), and then optionally disconnected from the pressure vessel, after which the pressure vessel can travel along a flight trajectory without the propulsion module. However, the propulsion module can additionally or alternatively include any other suitable elements in any suitable arrangement.

3.6 Safety Module

The system can optionally include one or more safety modules 13, such as parachutes, auxiliary propulsion systems (e.g., rockets such as retrorockets, propellers, jet engines, etc.), flight control surfaces (e.g., surfaces, such as fixed and/or rotary wings, rudders, ailerons, and/or elevators, configured to control vehicle flight, such as powered or unpowered descent, in operation as an aerodyne), and/or any other suitable elements. The safety module can function to slow descent of the system (e.g., in circumstances in which the propulsion module is not able to sufficiently slow system descent on its own, in circumstances in which the propulsion module fails and/or is detached from the capsule, etc.), can function to reposition the system (e.g., redirect capsule trajectory to ensure a water landing rather than a terrestrial landing), and/or can function to provide safety (e.g., backup safety) for the system in any other suitable manner. The system can additionally or alternatively include any other suitable elements (e.g., as described in U.S. Provisional Patent Application 62/969,447, filed 3 Feb. 2020 and titled "Space Capsule", which is herein incorporated in its entirety by this reference, such as described regarding the 'Backup Descent System').

3.7 Specific Example

In one embodiment (e.g., in which the reference surface is a closed convex surface of revolution with aspect ratio of approximately 0.6, such as an Euler's elastica), the capsule includes a substantially regular array of meridional members arranged around the circumference of the surface (e.g., with one meridional member absent from this arrangement), such as with approximately 20° spacing (for a total of 17 meridional members plus one omitted member location, as shown by way of example in FIGS. 4A-4F). In this embodiment, the capsule preferably includes a regular array of windows between the meridional members (e.g., with two windows, corresponding to the windows that would be located adjacent to the omitted meridional member, also omitted from this regular array), preferably with substantially identical spacing as the meridional members (e.g., for a total of 16 windows plus two omitted window locations). In this example, the windows preferably exhibit greater curvature than the reference surface, both in the circumferential and meridional directions, and preferably have a greater meridional length than width (e.g., wherein the window width is substantially less than the meridional window length). In alternate variations, this embodiment can include any other suitable number of omitted meridional member locations and/or window locations (e.g., 0, 1, 2, 3, 4, 5-10, etc.), preferably wherein the number of omitted window locations is one greater than the number of omitted meridional member locations, but alternatively wherein the numbers are equal or have any other suitable relationship. In alternate variations, this embodiment can include substantially regular spacing of any other suitable angle (e.g., 5°, 10°, 12°, 15°, 18°, 24°, 30°, 36°, 40°, 35°, 60°, 72°, 90°, 120°, 180°, 1-5°, 5-10°, 10-15°, 15-25°, 25-40°, 40-60°, 60-90°, 90-120°, 120-180°, etc.), can include irregularly-spaced elements, and/or can include any other suitable arrangements of the meridional members and/or windows.

In this embodiment, the propulsion module is preferably tethered to the capsule at or near some or all of the meridional members, more preferably wherein the tether locations have substantially regular spacing around the central axis. For example, the propulsion module can be tethered to the capsule at nine locations substantially regularly spaced around the structural frame (e.g., each substantially arranged on a meridian that bisects a meridional member of the structural frame, such as attached to the meridional member or attached to the hub above the meridional member).

In this embodiment, the capsule preferably includes a primary hatch arranged substantially in the location of the omitted meridional member and/or windows, and optionally includes a secondary hatch located at or near the apex of the pressure vessel (e.g., as shown in FIGS. 4A-4F).

However, the system can additionally or alternatively include any other suitable elements in any suitable arrangement.

4. Method of Operation.

The method of operation 20 is preferably performed using the aerospace vehicle system 10. The method 20 preferably includes: holding one or more live occupants (e.g., humans) in a cabin of the system; maintaining a breathable atmosphere in the cabin; and (preferably using the propulsion module of the system) taking off, ascending, maintaining altitude, descending, and/or landing, wherein at altitude, the system preferably develops and/or maintains a pressure differential between the cabin and the atmosphere surrounding the system.

The method 20 can include operating the system such as described in U.S. Provisional Patent Application 62/969,447, filed 3 Feb. 2020 and titled "Space Capsule", which is herein incorporated in its entirety by this reference (e.g., as described regarding the 'Capsule System' and/or 'Launch and Recovery'). However, the method can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. An vehicle comprising:
   a structural frame comprising:
      a first end;
      a second end opposing the first end across a reference plane, wherein the reference plane defines a primary axis orthogonal to the reference plane, wherein the primary axis intersects the first and second ends; and
      a set of arcuate members bowed outward of the primary axis between the first and second ends, wherein a first distance separates the primary axis and the first arcuate member of the set in the orthogonal reference plane;
   a set of windows attached to the structural frame, each window extending between a respective pair of adjacent arcuate members of the set and comprising a respective interior window surface which intersects the orthogonal reference plane along a respective reference segment, wherein a maximum distance between each reference segment and the primary axis is larger than the first distance;
   wherein the set of windows and the structural frame cooperatively define a pressure vessel interior which is fluidly isolated from an exterior environment.

2. The vehicle of claim 1, further comprising a passenger seat arranged within the pressure vessel interior and structurally supported by the second end.

3. The vehicle of claim 1, wherein the set of windows comprises a first subset of windows and a second subset of windows, wherein the first subset of windows is symmetric with the second subset of windows about a midplane defined by the first arcuate member, the midplane of the first arcuate member comprising the primary axis.

4. The vehicle of claim 3, further comprising a hatch arranged between a second arcuate member of the set and third arcuate member of the set.

5. The vehicle of claim 4, wherein the first subset of windows is arranged at a portion of the vehicle bounded by the first and second arcuate members, wherein the first subset of windows comprises at least 5 windows.

6. The vehicle of claim 1, wherein the greatest distance between the primary axis and an interior of the structural frame is the first distance.

7. The vehicle of claim 1, wherein a radius of curvature of the reference segment is smaller than the first distance.

8. The vehicle of claim 1, wherein the orthogonal reference plane is equidistant from the first and second ends.

9. The vehicle of claim 1, wherein the set of arcuate members defines a reference surface, wherein each arcuate member intersects the reference surface across a full span of the respective arcuate member between the first and second ends of the structural frame, wherein the reference surface defines an Euler's elastica.

10. The vehicle of claim 1, wherein:
   the vehicle maintains an air pressure differential between the pressure vessel interior and the exterior environment such that an interior air pressure within the pressure vessel interior is greater than an exterior air pressure of the exterior environment;
   the air pressure differential exerts an axial load on the vehicle;
   the arcuate members are configured to transfer a majority of the axial load between the first and second ends; and
   the set of windows cooperatively define a greater circumferential length fraction about the primary axis in the orthogonal reference plane than the set of arcuate members.

11. The vehicle of claim 1, wherein a meridional profile of the structural frame defines an isotensoid shape.

12. The vehicle of claim 1, wherein an optical distortion of a horizon line, as viewed through of a window of the set, is substantially imperceptible by vehicle occupants.

13. The vehicle of claim 1, wherein the vehicle is a lighter-than-air vehicle and further comprises set of tether mounts at the first end configured to tether a balloon to the structural frame, the balloon configured to contain a lighter-than-air fluid.

14. A vehicle defining a vehicle interior and a vehicle exterior, the vehicle comprising:
   a structural frame comprising:
      a first end comprising a set of tether mounts at the vehicle exterior;
      a second end opposing the first end across a reference midplane, wherein the reference plane defines a primary axis orthogonal to the reference midplane which intersects the first and second ends; and
      a set of arcuate members bowed outward of the primary axis between the first and second ends;

a passenger seat arranged within the vehicle interior and structurally supported by the second end; and a set of arcuate windows attached to the structural frame, each arcuate window attached between a respective pair of adjacent arcuate members of the set at a respective sealed boundary, each arcuate window bulged outward of the primary axis from the respective sealed boundary, wherein the set of windows and the structural frame cooperatively fluidly isolate the vehicle interior from the vehicle exterior.

15. The vehicle of claim 14, wherein each arcuate window has a smaller radius of curvature in the reference midplane than each arcuate member of the respective pair of arcuate members.

16. The vehicle of claim 14, wherein each arcuate window has a larger radius of meridional curvature than the respective pair of arcuate members and a smaller radius of circumferential curvature in the reference midplane than the respective pair of arcuate members.

17. The vehicle of claim 14, wherein, for each arcuate window, a midplane meridional arc length defined at the respective midplane is larger than a boundary meridional arc length defined along the respective sealed boundary, wherein the respective midplane of each window comprises the primary axis.

18. The vehicle of claim 14, wherein a geometry of each arcuate member along the sealed boundary of an attached arcuate window substantially continues a curvature of the attached arcuate window.

19. The vehicle of claim 14, wherein the vehicle further comprises a balloon tethered to the structural frame at the set of tether mounts.

20. The vehicle of claim 14, wherein the set of arcuate windows comprises a first subset of arcuate windows and a second subset of arcuate windows, wherein the first subset of windows is symmetric with the second subset of windows about a midplane of an arcuate member of the set, the midplane of the arcuate member comprising the primary axis.

21. The vehicle of claim 14, further comprising a hatch arranged between a second arcuate member of the set and third arcuate member of the set.

\* \* \* \* \*

UNITED STATES PATENT AND TRADEMARK OFFICE
CERTIFICATE OF CORRECTION

| | | |
|---|---|---|
| PATENT NO. | : 11,878,784 B2 | Page 1 of 1 |
| APPLICATION NO. | : 17/370467 | |
| DATED | : January 23, 2024 | |
| INVENTOR(S) | : Rodger Farley et al. | |

It is certified that error appears in the above-identified patent and that said Letters Patent is hereby corrected as shown below:

In the Claims

Column 15, Line 59, In Claim 1, after "plane;", insert --and--

Signed and Sealed this
Nineteenth Day of March, 2024

Katherine Kelly Vidal
*Director of the United States Patent and Trademark Office*